(12) United States Patent
Sundaresan et al.

(10) Patent No.: US 8,374,135 B2
(45) Date of Patent: Feb. 12, 2013

(54) METHODS AND SYSTEMS FOR LOCATION-BASED ALLOCATION OF MACRO CELL RESOURCES

(75) Inventors: Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 783 days.

(21) Appl. No.: 12/567,145

(22) Filed: Sep. 25, 2009

(65) Prior Publication Data

US 2010/0118996 A1 May 13, 2010

Related U.S. Application Data

(60) Provisional application No. 61/114,200, filed on Nov. 13, 2008.

(51) Int. Cl.
*H04W 4/20* (2009.01)
(52) U.S. Cl. ........ 370/329; 370/310; 370/328; 455/403; 455/422.1; 455/446; 455/447

(58) Field of Classification Search .................. 370/210, 370/328, 329; 455/403, 422.1, 446, 447
See application file for complete search history.

(56) References Cited

U.S. PATENT DOCUMENTS

| | | | |
|---|---|---|---|
| 2005/0195843 A1* | 9/2005 | Ahmed et al. | 370/411 |
| 2008/0076425 A1 | 3/2008 | Khetawat et al. | |
| 2008/0159249 A1* | 7/2008 | Takahashi et al. | 370/343 |
| 2009/0042536 A1 | 2/2009 | Bernard et al. | |
| 2009/0092078 A1 | 4/2009 | Czaja et al. | |
| 2009/0092096 A1 | 4/2009 | Czaja et al. | |
| 2009/0233544 A1* | 9/2009 | Oyman et al. | 455/7 |

\* cited by examiner

*Primary Examiner* — Andrew Lai
*Assistant Examiner* — Siming Liu
(74) *Attorney, Agent, or Firm* — James Bitetto; Joseph Kolodka

(57) ABSTRACT

Methods and systems for reusing macro cell resources in femto cell base stations or relay stations in a non-collaborative manner are disclosed. In addition, orthogonal resource allocation between a macro cell base station and femto cell base stations/relay stations may be dynamically adjusted by considering user-population variance. Moreover, an additional level of spatial reuse by femto cell base stations or relay stations can be provided by employing macro cell user location information.

18 Claims, 10 Drawing Sheets

METHODS AND SYSTEMS FOR LOCATION-BASED ALLOCATION OF MACRO CELL RESOURCES

RELATED APPLICATION INFORMATION

This application claims priority to provisional application Ser. No. 61/114,200 filed on Nov. 13, 2008, incorporated herein by reference.

BACKGROUND

1. Technical Field

The present invention relates to allocation of resources to femto cell base stations and relay stations and, more particularly, to allocation of time-frequency blocks of orthogonal frequency division multiple access (OFDMA) frames to femto cell base stations and relay stations.

2. Description of the Related Art

Femto cells are a cost-effective means of providing ubiquitous connectivity in future broadband wireless networks. In general, femto cells have primarily been used to improve coverage in current business solutions. There has been a significant impetus towards the deployment of these femto cell solutions by several cellular providers, which has also increased their importance for consideration in the future OFDMA-based standards such as Long Term Evolution (LTE) and for use in technologies such as World Interoperability for Microwave Access (WiMAX).

Current UMTS-based femto solutions have focused on improving indoor coverage in existing cellular systems. Here, users that are moved to femto cells experience increased throughput due to shorter ranges. In turn, users communicate to the macro cell base station via the femto cells by using a cable backhaul between femto cells and the macro cell base station. UMTS-based femto cell solutions are similar to other femto cell solutions in that they are driven primarily from a business incentive perspective, where the ability to reuse cable backhaul helps provide extended coverage to users, thereby reducing user-churn for network providers. Hence, current UMTS-based femto solutions mainly focus only on interference mitigation between macro and femto cells through way of power control.

An architecture that is analogous to some degree to femto cell systems currently used is that of wireless local area network (WLAN) hotspots inside a macro cell. Several works have examined problems pertaining to handoff, coverage, etc. in the combined wireless wide area network (WWAN)-WLAN architecture. However, the varied technologies and spectrums employed decouple the resource management problem in the two separate networks using two different sets of resources. The WLAN hotspot technologies do not consider managing shared, common resources between different types of networks.

With regard to distributed channel allocation schemes, WLAN technologies only focus on access points converging to a single mutually orthogonal channel for operation, after which the allocation can be statically retained. Medium access control (MAC) in ad-hoc networks offer another means for resource allocation in distributed operations. However, they are typically variants of 802.11 MAC protocol that use control messages in aiding the distributed control.

SUMMARY

Exemplary embodiments of the present invention address the deficiencies of the prior art by providing an efficient means for reusing macro cell resources at femto cell base stations that can dramatically enhance system performance. For example, spatial reuse by femto cell base stations can be provided by employing location-based resource management systems and methods, which address the tradeoff between macro and femto throughputs.

It should be understood that an "extension cell base station" is hereby defined as being either a femto cell base station or a relay station. A femto cell base station employs a cable backhaul to communicate with a macro cell base station or a network controller while a relay station employs a wireless backhaul to communicate with a macro cell base station or a network controller. It should also be understood that, except for the use of a cable backhaul, all aspects described herein with respect to femto cell base stations can be applied to relay stations.

In one exemplary embodiment of the present invention, a method for allocating tiles corresponding to time-frequency resource blocks of orthogonal frequency division multiple access (OFDMA) frames dedicated to a macro cell base station to facilitate reuse of macro cell resources by distributed extension cell base stations includes: providing a chart defining location zones composing the macro cell; allocating at least a portion of said tiles to macro cell users by considering, for each user, both a total number of macro cell users in a corresponding zone in which the user is located and a marginal utility for the user that is based on instantaneous rate and throughput information for the user; and transmitting to the extension cell base stations an indication of which zones are employed by macro cell users to enable extension cell base stations to assign at least a portion of said tiles to extension cell users.

In another exemplary embodiment of the present invention, a system for allocating tiles corresponding to time-frequency resource blocks of orthogonal frequency division multiple access (OFDMA) frames system dedicated to a macro cell base station includes: the macro cell base station, wherein the macro cell base station is configured to employ a chart defining location zones composing the macro cell and to allocate at least a portion of said tiles to macro cell users by considering, for each user, both a total number of macro cell users in a corresponding zone in which the user is located and a marginal utility for the user that is based on instantaneous rate and average throughput information for the user, wherein said macro cell base station is further configured to transmit an indication of which zones are employed by macro cell users; and a set of distributed extension cell base stations, wherein each particular extension cell base station is configured to monitor interference from the macro cell base station and to decode the indication received from the macro cell base station, wherein, if said interference is below a threshold, the particular extension cell base station is further configured to select a set of said tiles to reuse for extension cell users based on said indication and to distribute allocation messages to the extension cell users to permit communication on said set of tiles.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
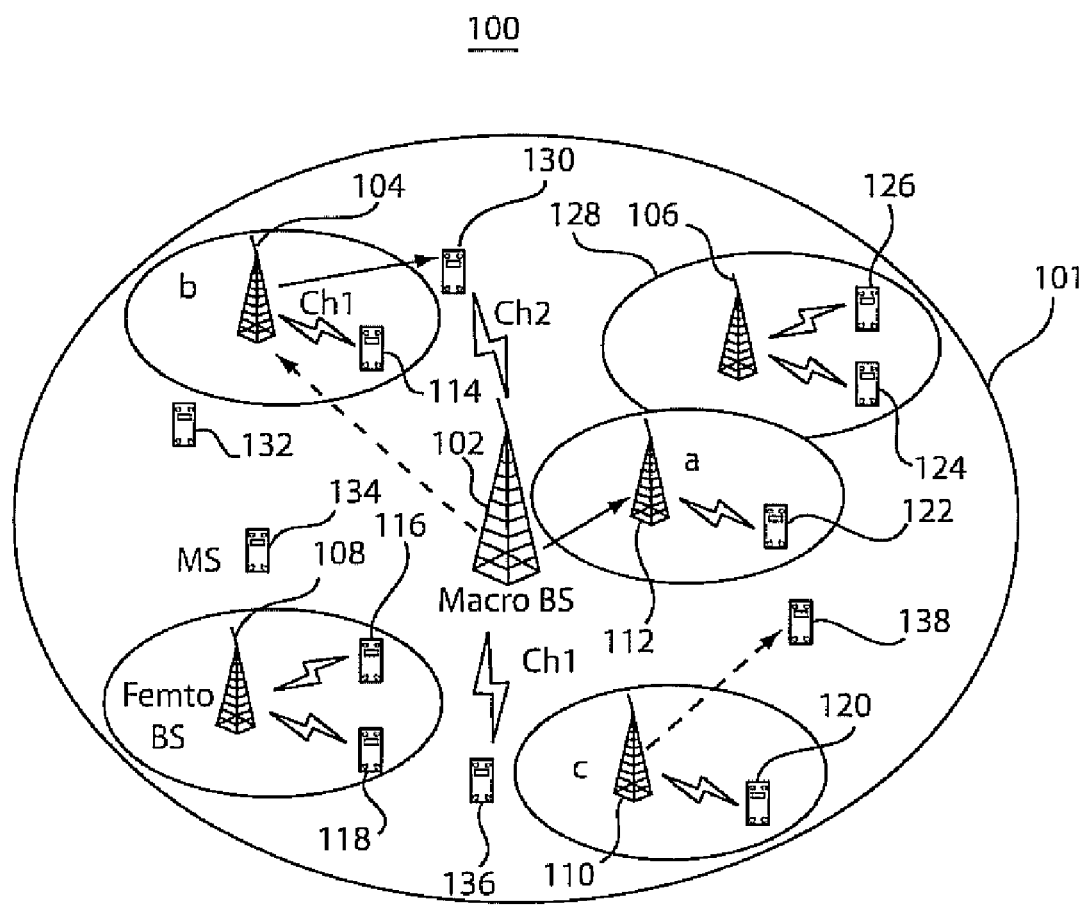
FIG. 1 is a diagram illustrating a base station system in accordance with one exemplary embodiment of the present invention.

As noted above, the primary purpose of femto cells has been to improve coverage in business solutions. Their decreased cell sizes in turn may also provide improved cell capacity through increased spatial reuse of macro cell resources, wherein multiple femto transmissions can be executed on the same sub-channel in a macro cell. Femto cell reuse of macro cell resources provides benefits to both macro cell users and femto cells users. For example, femto cell reuse of macro cell resources results in higher femto user throughput, while at the same time additional macro users can be accommodated with higher macro throughput, which provides a beneficial situation that has not be well exploited by current solutions. Improved capacity resulting from spatial reuse may be employed to meet the demand for bandwidth-intensive internet protocol (IP) services such as video streaming, IP television (IPTV), video-on-demand services, etc. Further, such demands can be met using systems and methods provided below without having to appreciably increase subscription services, thereby reducing the user churn.

A difficult problem with allocating resources to femto cells is the lack of direct coordination between the macro and femto cell base stations and the completely distributed nature of femto cells. To address the problem, several efficient resource management solutions for OFDMA-based femto cells with performance guarantees are provided herein below. Comprehensive evaluations indicate that in addition to providing improved coverage indoors, with carefully designed resource management solutions that leverage spatial reuse, femto cells have a great potential to increase the system performance by two folds.

In contrast to UMTS architectures discussed above, exemplary embodiments of the present invention provide more efficient interference mitigation by employing intelligent channel allocation using OFDMA features that do not necessarily require power control. Furthermore, unlike WLAN solutions, which require only good convergence properties for a single, mutually orthogonal channel, exemplary aspects of the present invention adapt to varying availability of multiple OFDMA sub-channels, which varies with user-population, and possess both good throughput and convergence properties. Moreover, contrary to MAC protocol allocation, distributed access does not permit application of ad-hoc network solutions due to a lack of control messaging, preventing the direct application of ad-hoc solutions. As discussed more further below, exemplary systems and methods may employ specialized random hashing technique adapted to enable an efficient medium access scheme for femto cells. In addition, because of the dependence of channel conditions on location, location is an important resource parameter that has not been adequately considered by prior art methods. Current methods use location information to determine the best wireless technology to operate on for optimized performance. In contrast, exemplary implementations of the present invention include a novel location-based resource management solution for leveraging maximal spatial reuse from femto cells, as discussed herein below.

As noted above, exemplary methods and systems of the present invention address the problem of a lack of direct coordination between macro and femto cells and also between femto cells themselves. The femto cells operate on the same OFDMA technology as the macro cell and hence can receive interference from macro cell transmissions. Although the range of a femto cell base station is typically much smaller than that of a macro cell base station, femto cell transmissions may cause interference to other femto cells and to macro cell users operating on the same channel in close proximity to the femto cell. Thus, the efficiency of resource management between macro and femto cells depends on the level of indirect coordination that is enabled between the two. This, in turn, depends on whether (i) the femto cell base station belongs to the same service provider as the macro cell base station, which is referred to herein as the "coupled" resource management model; or (ii) the femto cell base station and the macro cell base station belong to different service providers, which is referred to herein as the "isolated" resource management model. For example, in the isolated case, the femto cell base station may belong to third party vendors to whom spectrum is leased out by the macro cell base station provider. Accordingly, both models are considered below.

First, the isolated resource management model is considered. As discussed further below, to avoid interference between the macro and femto, one facet of exemplary systems and methods may optionally include assignment of orthogonal resources, namely time and sub-channel slots, to macro and femto cell users. Exemplary systems and methods described herein below indicate how available time and sub-channel resources in a frame may be split between the macro and femto users so as to maximize the aggregate system utility, which may not only account for throughput but also fairness. In addition, exemplary systems and methods may also adapt the split in resources over time to account for dynamic changes in macro/femto cell user-population in a macro cell. Furthermore, exemplary systems and methods may incorporate allocation of resources between femto cell base stations, with a given split between macro and femto cell resources, in a completely distributed manner, without any coordination, to leverage the potential spatial reuse available.

In the coupled model, exemplary systems may employ the same or similar aspects discussed above with regard to the isolated model in addition to other enhancing features. For example, according to other exemplary aspects of the present invention, in addition to using orthogonal resources assigned to the femto cells via the resource split described above, femto cells may be dynamically allocated resources that were originally assigned to the macro cell. For example, due to the smaller size of femto cells, those that are farther from the macro cell base station will not be interfered by it. However, macro cell users close to such farther femto cell base stations might experience interference from the femto cell base stations. Hence, a farther femto cell base station may still reuse those macro cell resources that are not scheduled to macro users lying in its vicinity. This permits for an additional level of spatial reuse, where the femto cells reuse resources assigned to the macro cell. However, interference between macro and femto operating on the same resources should be taken into account.

To facilitate this additional level of spatial reuse, some schedule information of the macro cell base station should be provided to the femto cell base stations. Thus, resource management in the coupled model has its own set of problems that are addressed by exemplary implementations of the present invention described below. For example, due to the distributed nature of resource allocation among femto cells, several frames are employed for convergence. This limits the time granularity of macro schedule adaptation, resulting in a loss of multi-user diversity (MUD) and, consequently, a tradeoff between macro and femto user throughput. The tradeoff is also affected by the granularity of macro schedule information provided. For example, while a finer granularity permits a higher potential for spatial reuse in femto cells, it also results in a higher overhead and a lower MUD for the macro cell. Moreover, while the farther femto cells can reuse macro resources, those closer to macro BS should be allocated orthogonal resources due to excessive interference. Hence, the resource split should take into account these factors in addition to considering all levels of spatial reuse possible within femto cells.

Referring now in detail to the figures in which like numerals represent the same or similar elements and initially to FIG. 1, an exemplary system for implementing resource allocation methods disclosed herein in accordance with the present invention is illustrated. As shown in FIG. 1, system 100 may include a macro cell 102 servicing macro cell users 130-138. In addition, system 100 may include a set of distributed femto cell base stations 104-112 servicing femto cell users or clients 114-126. As shown in FIG. 1, each femto cell base station services femto cell clients in a corresponding femto cell 128.

The macro cell 101 is embedded with several femto cells 128 that may represent residential or enterprise networks, as illustrated in FIG. 1. The femto base stations and the macro base station may operate using the same OFDMA technology. For example, the femto base stations and the macro base stations may operate using WiMAX or LTE. The power used by each femto BS may be an order of magnitude lesser than the macro cell base station. This permits for multiple femto cell base stations to operate in tandem on a given channel, thereby providing spatial reuse. Further, interference from the femto cell base stations to macro users may be restricted to its vicinity. In the exemplary system 100, there is no direct coordination between the femto cell base stations and the macro BS on the wireless edge. However, a network controller (not shown) on the backplane could potentially interface between the femto and macro base stations on the cable backhaul. Given the delay on the backhaul, real-time coordination at the granularity of a frame may not be possible between the macro and femto base stations.

Figure 2:
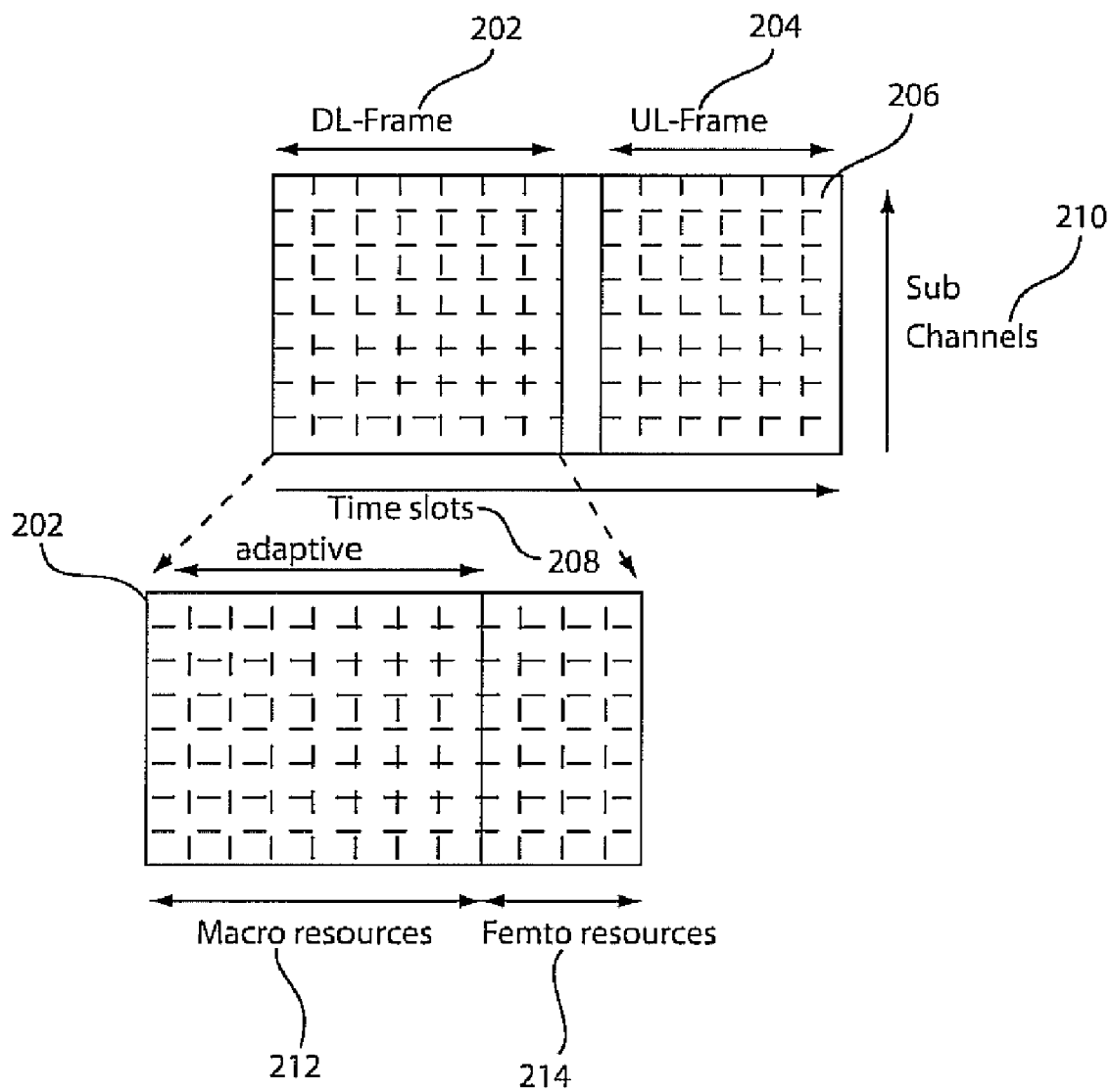
FIG. 2 is a block diagram illustrating a split of orthogonal resources of an OFDMA frame between a macro cell base station and femto cell base stations in accordance with one exemplary embodiment of the present invention.

In accordance with exemplary implementations of the present invention, a total set of K users are considered, a fraction of which is distributed uniformly within the macro cell, while the remaining is distributed uniformly within the femto cells. The fraction of users within the macro and femto cells may vary with the load conditions. An OFDMA frame structure similar to WiMAX that is populated with time-frequency resource tiles, as illustrated in FIG. 2, is considered. As shown in FIG. 2, an downlink (DL) OFDMA frame 202 and an uplink (UL) OFDMA frame 204 includes tiles that have both time and frequency domain components. For example, the time slots 208 are distributed along the horizontal axis while the sub-channel slots 210 are distributed along the vertical axis.

An objective is to allocate resources, here formulated as tiles, to macro and femto users such that aggregate system utility is maximized, whereby both throughput and fairness of the users is taken into account. The proportional fairness model may be employed, given its ability to strike a good balance between utilization and fairness. The system can be shown to converge to the optimum if the scheduler's decisions at each epoch (interval) are made to maximize the aggregate marginal (incremental) utility, $S_{max}$, wherein $$S_{max} = \mathrm{argmax}_{S_f, S_m} \left\{ \alpha \sum_{f \in S_f} \Delta U_f + (1-\alpha) \sum_{m \in S_m} \Delta U_m \right\}.$$

$\Delta U_f$, $\Delta U_m$ denote the marginal utility received by femto and macro cell users f and m, respectively, in a feasible femto/macro schedule $(S_f, S_m)$.

$$\Delta U_f = \frac{r_f}{\bar{r}_f} \text{ and } \Delta U_m = \frac{r_m}{\bar{r}_m}$$

for proportional fairness, where $\bar{r}_f$ and $\bar{r}_m$, represent average throughputs of the respective users, and α is the prioritization factor. As illustrated in FIG. 2, using the proportional fairness model, orthogonal sets of tiles 212 and 214 of an OFDMA frame 202 may be allocated for macro cell users and for femto cell users, respectfully.

Driven by different market models, as discussed above, isolated and coupled models for resource allocation between macro and femto cells are considered. In the isolated model, resources are orthogonalized/split between the macro and the femto cells to eliminate interference between the two categories of users. The isolated model is suitable for scenarios where the femto BS that is bought by the consumer does not belong to the same service provider as the macro BS. There may be a coarse level of indirect coordination between the femto cell base station and the macro cell base station through the cable backhaul, with the macro cell base station notifying the femto cell base stations of the manner in which resources are split. Alternatively, a network controller may notify both the macro cell base station and the set of distributed femto cell base stations of the resource split.

The coupled model is a more sophisticated in that it enables indirect coordination on the wireless link. Here, femto cells are permitted to reuse even parts of the macro resources, such as, for example, tiles within set 212, without causing significant interference with macro cell base station transmissions, thereby increasing the system capacity. The coupled model is suitable for scenarios where both the femto and macro base stations belong to the same service provider, thereby enabling more efficient resource utilization. For both the models, a slotted-synchronized system is considered, where the uplink and downlink of femto cells is synchronized with that of the macro cell, as is the case in current WiMAX femto cells standards. Exemplary systems and methods discussed herein are applicable to both the UL and the DL.

A summary of how resources are allocated in both the isolated and coupled models is illustrated in Table 1:

TABLE 1

| Resources | Isolated Model | Coupled Model |
| --- | --- | --- |
| Macro Cell | Used by macro cell users | Shared by macro cell and exterior femto cell users |
| Femto Cell | Used by femto cell users | Used by interior femto cell users |

As discussed herein below, exterior femto cell base stations are femto cell base stations that experience interference from macro cell base station transmissions that falls below some threshold. Conversely, interior femto cell base stations are femto cell base stations that experience interference from macro cell base station transmissions that falls above or at the threshold. The threshold is used to determine which femto cell base stations may reuse macro cell resources, as discussed below.

Figure 3:
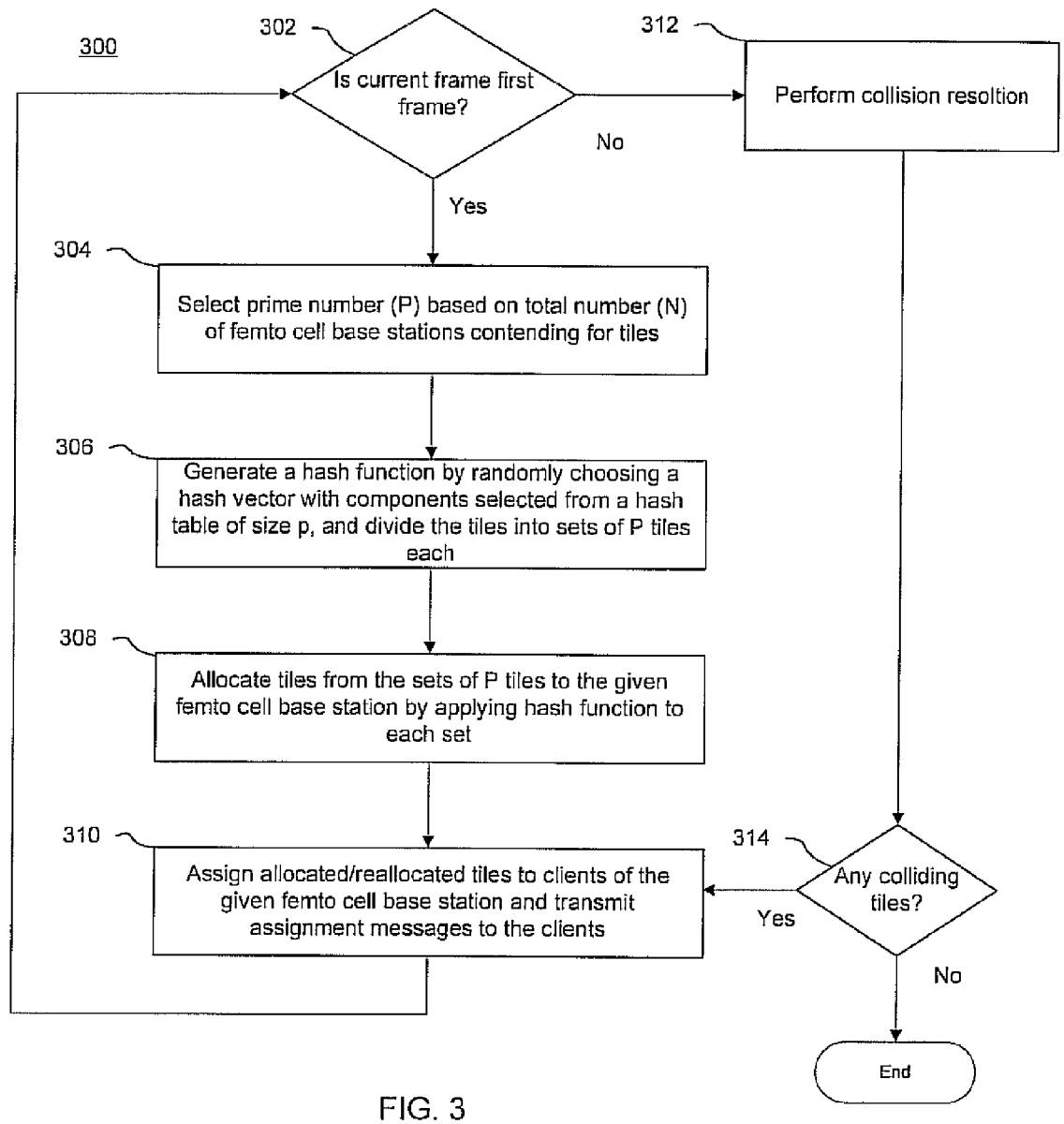
FIG. 3 is a block/flow diagram illustrating a method for distributed allocation of tiles between femto cell base stations in accordance with exemplary embodiments of the present invention.

With reference now to FIG. 3, an exemplary method 300 for uncoordinated allocation of tiles corresponding to time-frequency resource blocks of OFDMA frames between distributed femto cell base stations in accordance with one exemplary embodiment of the present invention is illustrated. Method 300 may be implemented in and performed by each given femto cell 104-112 of system 100 to determine resource allocation in a distributed manner. It should be understood that the tiles allocated to femto cell base stations may be orthogonal tiles within set 214 designated for femto cell base station use discussed above, tiles within set 212 dedicated for a macro cell that may be reused by femto cells, or both. In addition, method 300 may be employed in both the isolated model and the coupled model.

A random hashing technique for resource allocation among femto cells may be utilized in method 300. A property of the technique is that it permits for contention resolution without any coordination among the nodes involved. Let the set of nodes to be hashed belong to the universe U that can be represented by integers in [0,N−1] for some N corresponding to the total number of femto cell base stations contending for available tiles allocated to the macro cell. An objective is to hash/map the nodes from U into the set [0, n−1]. An exemplary hashing mechanism (h(u)) for a node u is shown in Algorithm 1 of Table 2:

TABLE 2

Algorithm 1 - Hashing Mechanism: h(u)

1:    Find a prime number p≈n.
2:    Represent u in binary. Split it into blocks of $\lfloor \log_2 p \rfloor$ bits such that $$u = \{u_1, u_2, \ldots, u_r\}, \text{ where } r \approx \left\lceil \frac{\log_2 N}{\lfloor \log_2 p \rfloor} \right\rceil \text{ and}$$

$u_i \in [0, p-1]$.
3:    Generate a set A of all vectors of the form $a = \{a_1, a_2, \ldots, a_r\}$, where
      $a_i \in [0, p-1]$.
4:    Pick a vector $a \in A$ at random.
5:    Output $h(u) = (\sum_{i=1}^{r} a_i u_i)_{mod\, p}$ As illustrated in Algorithm 1 of Table 2, a prime number (P) close or closest to the total number of femto cell base stations contending for available tiles allocated to the macro cell may be chosen. Thereafter, the node u may be represented in binary form, split into r blocks, where r is $$r \approx \left\lceil \frac{\log_2 N}{\lfloor \log_2 p \rfloor} \right\rceil.$$

A set of all vectors with P components is generated, one of which is chosen at random. The hash function h(u) is then determined to be the modulo-P sum of the dot product of the chosen vector and the node representation.

It should be noted that the hash function h(u) using modulo-prime belongs to the class of universal hash functions. A property of these functions is that for a hash $a \in A$, the probability that two elements, $u, v \in U$, map to the same hashed value, termed herein as "collision," is bounded as $$P_r[h_a(u) = h_a(v)] \leq \frac{1}{n}.$$

To construct a distributed random access scheme from the hash function, how the nodes should hash into a given set of T time-frequency tiles should be determined to find their allocations. In particular, the size of the hash table, t, to be used and the number of hash functions to be used, z, should be determined. To allocate tiles among the various femto cell base station nodes, a random access scheme may be employed in which every node splits the T tiles into consecutive blocks of t tiles each and uses z hash functions inside each of these blocks to determine their allocations. Thus, a node with a (t, z)-hashing scheme can obtain a maximum allocation of $$z \cdot \left\lceil \frac{T}{t} \right\rceil$$

tiles. It can be shown with respect to (t*,z*) that t* corresponds to the size of the contending node set and z*=1, provides the optimal hashing scheme.

TABLE 3

Algorithm 2 Distributed Random Access Scheme: DRA

1:   F : Set of femto BS; id mapped to integer set [0,N)
2:   % Distributed hashing in frame 1
3:   if frame = 1 then
4:       for all f ∈ F do
5:           Initialize allocation: $S_f(k)=0, \forall k \in [1,T]$
6:           Find the number of interfering femto BS: n
7:           Find a prime number, p ≈ n
8:           Pick a random hash vector $a \in A_p$, where $a = \{a_1,...,a_r\}$, where $$a_i \in [0,p-1] \text{ and } r = \left\lceil \frac{\log_2 N}{\lfloor \log_2 p \rfloor} \right\rceil.$$

9:           Write id of f(u) in binary; split it into r blocks such that
             $u = \{u_1,...,u_r\}$
10:          for $i = 1 : \left\lceil \frac{T}{p} \right\rceil$ do 11:              $x_i = \{(i-1)p + (\Sigma_{j=1}^r a_j u_j) \bmod p\}$
12:              $S_f(x_i) = 1$
13:          end for
14:      end for
15:      Execute proportional fair schedule within S(f), ∀f i.e. ∀t ∈ S(f), Schedule $h_t^* = \text{argmax}_{h \in f} \frac{R_h(t)}{\overline{R}_h}$ Update $\overline{R}_{m_t^*}$
16:  else
17:      % Collision resolution in all subsequent frames
18:      for all f ∈ F do
19:          Determine tiles that experienced collisions in $S_f$; denote it by $S_f^c$
20:          Pick a random hash vector $a \in A_2$, where $a = \{a_1,..., a_r\}$, where
             $a_i \in [0,1]$ and $r = \lceil \log_2 N \rceil$.
21:          Write id of f(u) in binary; split it into r blocks such that
             $u = \{u_1,...,u_r\}$
22:          for all $k \in S_f^c$ do
23:              $S_f(k) = (\Sigma_{j=1}^r a_j u_j) \bmod 2$
24:          end for
25:      end for
26:      Execute proportional fair schedule within S(f), ∀f
27:  end if

TABLE 4

Algorithm 3 DRA with Sensing Feature: DRA+

1:   If frame = 1 then
2:       % Same procedure as in DRA
3:   else
4:       % Access and contention resolution in all subsequent frames
5:       for all f ∈ F do
6:           Determine idle tiles and colliding tiles in $S_f$; denote it by $S_f^{cs}$
7:           Find the number of interfering femto BS: n
8:           Find a prime number, p ≈ n
9:           for $i = 1 : \left\lceil \frac{T}{p} \right\rceil$ do 10:              Find # elements (m) in $S_f^{cs}$ that belong to $[(i-1)p + 1, ip]$
11:              Find the smallest prime number ≧ m : q
12:              Pick a random hash vector $a \in A_q$, where $a = \{a_1,...,a_r\}$, where $$a_i \in [0, q-1] \text{ and } r = \left\lceil \frac{\log_2 N}{\lfloor \log_2 q \rfloor} \right\rceil$$

13:              Write id of f(u) in binary; split it into r blocks such that
                 $u = \{u_1,...,u_r\}$
14:              $y_i = (\Sigma_{j=1}^r a_j u_j) \bmod q$
15:              $x_i = S_f^{cs}(y_i)$ % Find the corresponding tile index TABLE 4-continued Algorithm 3 DRA with Sensing Feature: DRA+

16:            $S_f(x_i)=1$
17:         end for
18:     end for
19:     Execute proportional fair schedule within S(f), ∀f
20: end if Returning now to FIG. 3 and referring to Tables 3 and 4, method 300 may be delineated by two phases: a) hashing-based allocation in a first frame, which may be performed in steps 304-310; and b) collision resolution, which may be performed in steps 312 and 310. Alternative collision resolution embodiments are illustrated in Tables 3 and 4, and are discussed more fully below. While alternate embodiments of collision resolution are described, the hashing based allocation may be employed with both types of collision resolution processes. In addition, it should be understood that all processes described with respect to method 300 may be applied in both the isolated model and the coupled model discussed above. Method 300 may be performed for each time frame or OFDMA frame and repeated over time for every frame.

Method 300 may begin at step 302 in which a given femto cell base station determines whether the current frame is a first frame of a set of L frames. The set of L frames may correspond to a number of frames within which a femto cell base station allocation process converges to a set of allocated tiles for its users or clients that do not collide with tiles employed by femto cell base stations within an interference range. L may correspond to the average minimum number of frames in which resource allocation converges or may include some tolerance to ensure that optimal convergence occurs at each femto cell base station (BS).

If the current frame is determined to be a first frame in the L set of frames, then the method may proceed to step 304 in which a prime number (P or p) may be selected based on a total number (N or n) of femto cell base stations contending for tiles. For example, as illustrated in steps 4-7 of Algorithm 2 in Table 3, an allocation may be initialized, $S_f(k)=0$, ∀k∈ [1,T], where $S_f(k)=0$ denotes that a tile k is not allocated to the given femto cell base station and $S_f(k)=1$ denotes that a tile k is allocated to the given femto cell base station. Further, a femto cell base station may find the number of femto cell base stations contending for tiles. The number of contending base stations may be provided by a network controller or by other means prior to instituting the allocation method. In addition, the prime number P selected may be a prime number close to or closest to the total number of contending femto cell base stations. It should be understood that the number of contending femto cell base stations may depend on the set of interfering femto BS or the size of the largest maximal clique in an interference graph formed between femto cell base stations.

At step 306, the given femto cell BS may generate a hash function by randomly choosing a hash vector with components selected from a table of size P and may divide the available tiles into sets of P tiles each. For example, as illustrated in step 8 of Algorithm 2 in Table 3, the femto cell BS selects a random hash vector a∈$A_p$, where $$a = \{a_1, \ldots, a_r\}, a_i \in [0, p-1] \text{ and } r = \left\lceil \frac{\log_2 N}{\lfloor \log_2 p \rfloor} \right\rceil.$$

Further, the given femto cell BS represents an identifier of the given femto cell base station f(u), which is an identifier of the base station mapped to the integer set [0,N), in binary form and splits the binary representation into r blocks to generate an identifier vector u such that u={$u_1, \ldots, u_r$}, as shown in step 9 of Algorithm 2 in Table 3. Thereafter, the given femto cell BS splits the available tiles into blocks having P tiles each, as shown in step 10 of Algorithm 2 in Table 3 to permit application of the hash function on the blocks. As shown in step 11 of Algorithm 2 in Table 3, the hash function in this exemplary embodiment is $$\left\{(i-1)p + \left(\sum_{j=1}^{r} a_j u_j\right) \bmod p\right\},$$

where i is an identifier for each block of P tiles.

At step 308, the femto cell base station may allocate itself tiles from the sets of P tiles by applying the hash function to each set. For example, as shown in blocks 11 and 12 of Algorithm 2 in Table 3, the femto cell base station may randomly choose tiles, $x_i$, by applying the hash function to each value of i representing each block of P tiles, $$x_i = \left\{(i-1)p + \left(\sum_{j=1}^{r} a_j u_j\right) \bmod p\right\}.$$

The chosen tiles are allocated to the given femto cell base station, $S_f(x_i)=1$.

At step 310, the femto cell BS may assign the allocated tiles to its clients and may transmit assignment messages to the clients to permit communication on the allocated tiles. For example, as shown in step 15 of Algorithm 2 in Table 3, the femto cell base station may execute a proportional fair schedule within the set of allocated tiles, S(f), ∀f i.e. ∀t∈S(f). For example, for each tile t, each user h is evaluated to determine the user, $h_t^*$, having the maximum utility for the particular tile t:

$$h_t^* = \operatorname{argmax}_{n \in f} \frac{R_h(t)}{\overline{R}_h},$$

where $R_h(t)$ is the instantaneous rate and $\overline{R}_h$ is the average throughput for a user or client h.

Returning to step 302, if the current frame is a frame within the set of L frames that is subsequent to the first frame, the method may proceed to step 312, in which the given femto cell base station performs collision resolution for the current frame. As mentioned above, alternative, exemplary embodiments for collision resolution are described herein.

Figure 4:
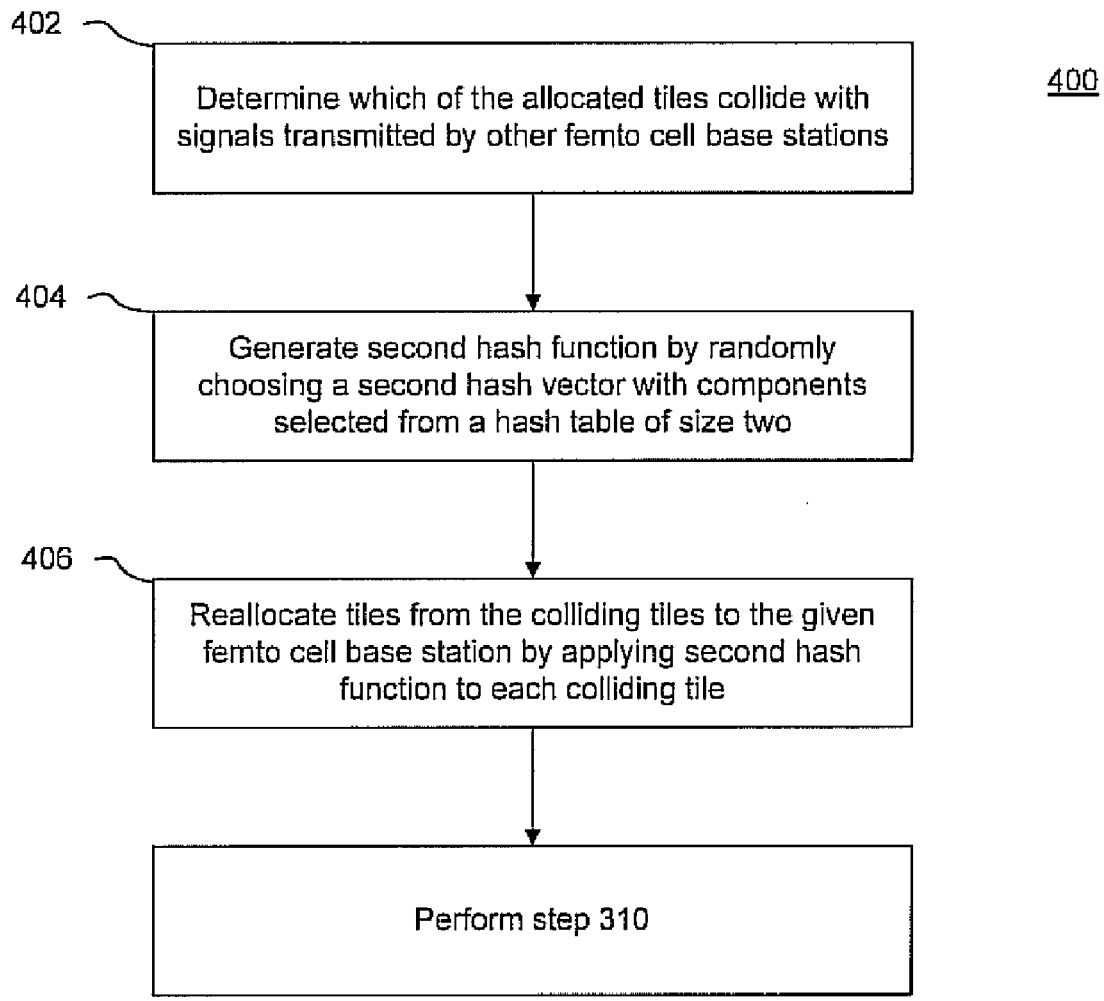
FIG. 4 is a block/flow diagram illustrating a method for tile collision resolution between femto cell base stations in accordance with one exemplary embodiment of the present invention.

With reference to FIG. 4 and continuing reference to Table 3 and FIG. 3, one exemplary collision resolution embodiment is described and may be performed at step 312. Here, the given femto cell BS retains the allocation for the successful tiles but attempts to resolve contention in the colliding tiles in the subsequent frames. The collision resolution may begin at step 402, in which the femto cell base station determines which tiles allocated to itself in the previous frame collide with signals transmitted by other femto cell base stations. For example, the given femto cell base station may monitor the transmission of signals on allocated tiles and determine whether any interference received on the allocated tiles exceeds some threshold to find the colliding tiles. Alternatively, the given femto cell base station may receive collision information measured by and transmitted from one or more clients. The colliding tiles are denoted here as $S_f^c$.

At step 404, the given femto cell base station may generate a second hash function by randomly choosing a second hash vector with components selected from a hash table of size two. For example, as shown in step 20 of Algorithm 2 in Table 3, a random hash vector $a \in A_2$ is selected, wherein $a = \{a_1, \ldots, a_r\}$, $a_r \in [0,1]$ and $r = \lceil \log_2 N \rceil$. Thus, the femto cell base station in this exemplary embodiment uses a hash table of size two to determine if it should continue accessing the collided tiles or cease using the collided tiles in subsequent frames. Similar to the processing described with respect to the first frame, the femto cell base station represents the identifier of the given femto cell base station f(u), taken from the integer set [0,N), in binary form and splits the binary representation into r blocks to generate a second identifier vector u such that $u = \{u_1, \ldots, u_r\}$, as shown in step 21 of Algorithm 2 in Table 3. However, r here is $\lceil \log_2 N \rceil$, as stated above. As shown in step 23 of Algorithm 2 in Table 3, the hash function comprises performing modulo-2 addition on the dot product of the second hash vector a and the second identifier vector u.

At step 406, the given femto cell BS may reallocate tiles from the colliding tiles for its use by applying the second hash function to each of the colliding tiles. For example, as shown in steps 22 and 23 in the exemplary embodiment described in Algorithm 2 of Table 3, for each tile $k \in S_f^c$, the femto cell base station randomly selects tiles within $S_f^c$ by applying the second hash function:

$$S_f(k) = \left(\sum_{j=1}^{r} a_j u_j\right) \bmod 2.$$

As noted above, the given femto cell base station may retain tiles, for its use, that do not collide with signals transmitted by other femto cell base stations. Thereafter, the process may proceed to step 310 in which the given femto cell base station assigns the reallocated tiles and the retained tiles to its clients and transmits assignment messages to its clients to permit communication on the reallocated and the retained tiles. Steps 312 and 310 may be iterated for subsequent frames until all tiles assigned by the given femto cell to its clients do not collide with signals transmitted by other femto cell base station. For example, during each iteration, at step 314, it may be determined whether tiles assigned by the given femto cell base station to its clients collide with signals transmitted by other femto cell base station. If there are colliding tiles, steps 310 and 312 iterated; otherwise the method may end. Once collision has been resolved, the schedule for the allocated tile is retained in the subsequent frames.

It should be noted that the hash vector for every hashing period can be randomly chosen by each femto cell BS using seeds that are consistent across femto cell base stations or the hash vector for every hashing period can be assigned by the macro cell base station or a network controller. Further, it can be shown that Algorithm 2 of Table 3, which may be referred to as a Distributed Random Access (DRA) scheme, converges to a stationary allocation within 3-4 frames. The allocated frames obtained after conversion may be retained until it is determined that circumstances warrant a reallocation of resources between macro and femto cell base stations. For example, such circumstances may include an appreciable change in the user population in femto cells and/or the macro cell upon which resources allocated to femto cells may also be varied, as discussed in more detail below. It should also be noted that the average case performance of the DRA the allocation scheme is bounded within $$\frac{1}{e} \leq \frac{C_{DRA}}{C_{OPT}} \leq \frac{2}{3},$$

where $C_{DRA}$ is the total throughput over a set of contending nodes per frame for the DRA scheme and $C_{OPT}$ is the total throughput over a set of contending nodes per frame for an optimal scheme, respectively. In the optimal scheme, all T available tiles are allocated.

Returning now to step 304 of method 300, as noted above, the determination of the number of femto cell base stations contending for available tiles may depend on the set of interfering femto BS or the size of the largest maximal clique in an interference graph formed between femto cell base stations. In the particular exemplary embodiment described in Algorithm 2 of Table 3, all nodes are assumed to have the same number of contending neighbors. However, in a practical network deployment, the density of femto BS varies from region to region, inducing variations in the degree of contention seen by adjacent femto BS. In Algorithm 2 of Table 3, each femto cell BS individually measures its interfering degree ($d_i$) and uses it for deciding the size of the hash table, which keeps the algorithm simple and completely distributed. However, in the presence of heterogeneous BS density, the approach forgoes some performance due to over-estimated contention; the size of the largest maximal clique ($d_c$) including the femto cell BS provides a better measure for the size of the hash table employed. A maximal clique comprises the largest set of mutually interfering femto cell base stations and its determination may be made with assistance from a network controller or the macro cell base station in alternative embodiments. In the presence of homogeneous BS density $d_c = d_i$ but with heterogeneous density $d_c \leq d_i$. The larger the gap between $d_c$ and $d_i$, larger is the loss in performance in the interference-degree based approach. While using the interference degree forgoes some performance, it can be shown that the performance loss is marginal for practical femto BS densities, where the gap between $d_c$ and $d_i$ is not significant for most femto cell base stations. This, coupled with its completely distributed nature, makes the interference-degree approach an attractive means for determining the number of contending femto cell base stations for DRA.

As noted above, in DRA, once hashing is completed in the first frame to determine channel access, re-hashing may be performed only on the collided tiles to resolve contention in the subsequent frames. When a femto BS experiences a collision in a tile, multiple colliding femto base stations hash into the same tile, which in turn leaves a proportional number of tiles in the hashing period idle. However, the DRA scheme mentioned above does not use such idle tiles for rehashing in subsequent frames, thereby accounting for the saturating performance of DRA with respect to an optimal allocation scheme irrespective of whether interference degree or maximal clique size is used for the hash table size. While determining collision is relatively straight-forward, as discussed above, sensing an idle tile involves evaluating all available tiles. For example, a given femto cell base station may monitor the transmission of signals on all tiles and determine whether any interference received on any of the tiles is below some threshold to find the idle tiles. Alternatively, the given femto cell base station may receive idle tile information measured by and transmitted from one or more clients. With an idle tile detection feature, the performance gap between the DRA approach and the optical approach can be bridged.

Further, while employing $d_c$ permits a more efficient spatial than employing $d_i$, $d_c$ is still a parameter local to the given femto cell BS, determined with the help of a network controller or the macro cell BS, that is dependent on which allocation decisions are made. The heterogeneity in femto BS density introduces another level of spatial reuse to leverage using two-hop information around the femto BS. Specifically, to leverage this additional level of spatial reuse, every femto cell BS should not only determine its largest maximal clique size but also those of its interfering femto BS.

Figure 5:
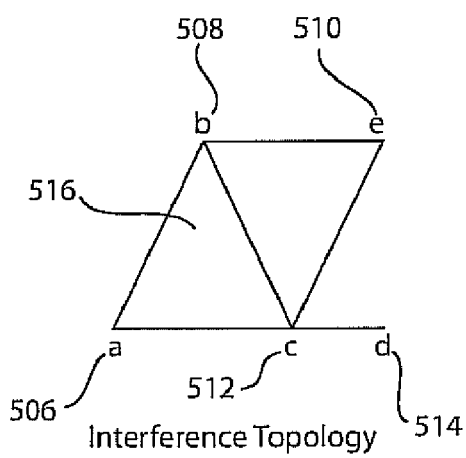
FIG. 5 is a diagram illustrating interference scenarios and detection capabilities by employing interference degree and largest maximal clique size of interfering femto cell base stations.

For example, with reference to FIG. 5, an interference topology 516 for femto cell base stations a 506, b 508, c 512, d 514 and e 510. In addition, tables 502 and 504 illustrate determination of the number of femto cells contending for available tiles using maximal clique size and interference degree, respectfully. For example, for femto cell b 508, use of maximal clique size yields 3 femto cell base stations contending for available tiles while use of interference degree yields 4 femto cell base stations contending for available tiles. The tables also indicate which tiles, numbered 1-12, are allocated to each femto cell base station. For example, femto cell base station a 506 is allocated tiles 1, 4, 7 and 10 in both tables. Elements 518 and 520 indicate tiles that are unused due to a lack of 2-hop information and tiles that are unused due to an over-estimated contention, respectively. BS d 514 has room for allocations in tiles 2 and 8 in the $d_c$ approach. Because d 514's interfering neighbor c 512 has a higher maximal clique size, d 514 can be more aggressive, as c will contend for a lesser number of tiles. Thus, each femto cell BS may employ the largest maximal clique size of its interfering neighbor base stations in addition to its own to leverage spatial reuse. However, by using an idle tiles sensing feature, such spatial reuse is automatically leveraged as and when idle tiles are detected. Thus, while the $d_c$ approach performs better than the $d_i$ approach with collision detection only, both approaches perform close to optimal with fast convergence if the femto cells employ both collision and idle tile detection. Although the sensing feature enables the $d_i$ to improve spatial reuse, the $d_c$ approach has better fairness or utility than the $d_i$ approach, which has a bias against femto cell base stations with a larger interference degree ($d_i > d_c$). However, it should be understood that exemplary embodiments of the present invention may employ one or both of the $d_i$ approach and the $d_c$ approach.

Figure 6:
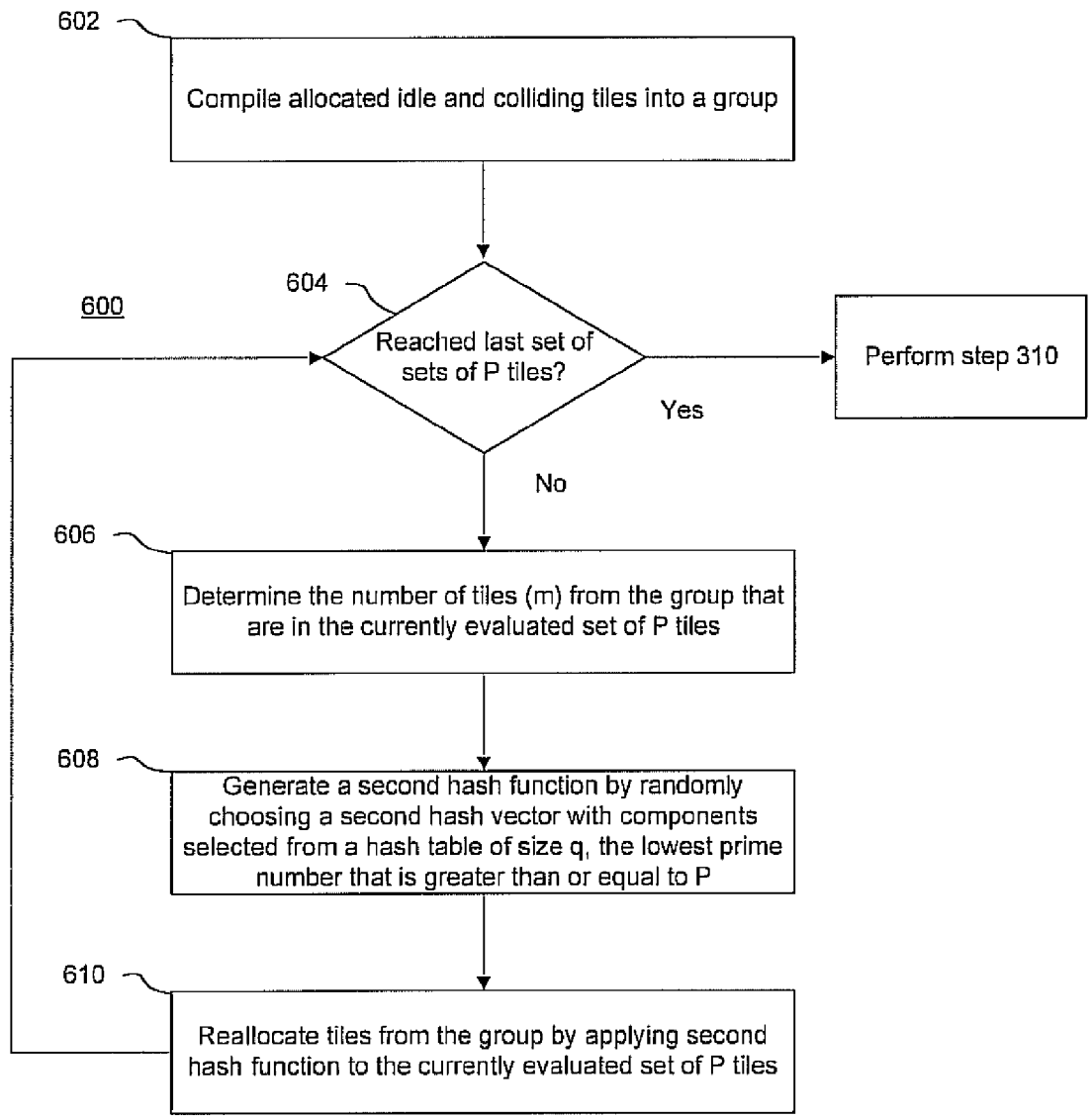
FIG. 6 is a block/flow diagram illustrating a method for tile collision resolution between femto cell base stations that considers idle tiles in accordance with one exemplary embodiment of the present invention.

With reference now to FIG. 6, with continuing reference to FIGS. 3 and 4, Table 3 and Table 4, another exemplary method 600 for resolving collisions taking into account idle tiles that may implement step 312 of method 300 and that may be performed in lieu of method 400 is illustrated. Table 4 provides an exemplary algorithm, denoted "DRA+" or Algorithm 3, for allocating tiles using a collision resolution scheme that employs an idle tile sensing feature. Method 600 may begin at step 602, after a determination in step 302 that the current frame is not a first frame. At step 602, the given femto cell base station may compile a group of tiles composed of idle tiles and colliding tiles from the previous frame. Here, the colliding tiles may be selected from the set of tiles allocated to the given femto cell base station in the previous frame. The colliding tiles may be determined in the same manner discussed above with respect to step 402. In addition, the idle tiles may, for example, be detected by receiving idle tile information from the client or by determining whether any interference received on any of the tiles is below some threshold, as discussed above. The group of idle and colliding tiles are denoted here as $S_f^{cs}$.

It should be noted that the following steps, steps 606-610, may be performed for each set of the sets of P tiles that includes any of the allocated idle and colliding tiles. The sets of P tiles may correspond to those determined in step 306, for example. Thus, at step 604, the given femto cell BS may determine whether all such sets that include idle and colliding tiles have been evaluated. If not all of such sets have been evaluated, steps 606-610 may be performed on the next set of P tiles. As shown in step 9 of the DRA+ algorithm in Table 4, evaluation of each block of P tiles may be implemented in a "for" loop.

At step 606, for the set of P tiles currently evaluated, the given femto cell BS may determine the number of tiles from the group of idle and colliding tiles that are within the corresponding set of P tiles. For example, as illustrated in step 10 of the DRA+ algorithm of Table 4, the given femto cell BS determines how many (m) of the idle and colliding tiles are in the corresponding block of P tiles currently evaluated.

At step 608, the given femto cell BS may generate a second hash function by randomly choosing a second hash vector with components selected from a hash table of size q, wherein q is a lowest prime number that is greater than or equal to m. For example, as illustrated in step 12 of the DRA+ algorithm of Table 4, the femto cell BS selects a random hash vector a∈$A_q$, wherein a={$a_1, \ldots, a_r$}, $a_i$∈[0, q−1] and $$r = \left\lceil \frac{\log_2 N}{\lfloor \log_2 q \rfloor} \right\rceil.$$

In addition, as shown in step 13 of the exemplary DRA+ algorithm of Table 4, the identifier of the given femto cell base station, discussed above with respect to method 300, may be represented in binary from and split into r blocks to generate a second identifier vector u={$u_1, \ldots, u_r$}. In addition, the hash function may comprise performing modulo-q addition on the dot product of the second hash vector and the second identifier vector, $$\left(\sum_{j=1}^{r} a_j u_j\right) \bmod q,$$

as shown in step 14 of the DRA+ algorithm in Table 4.

At step 610, the femto cell BS may reallocate tiles from the group of idle and colliding tiles to itself by applying the second hash function to the corresponding set. For example, as shown in steps 14-16 in the exemplary DRA+ algorithm of Table 4, the given femto cell base station allocates a tile by selecting one of the idle or colliding tiles in the corresponding block using the second hash function. It should be noted that the term "reallocate," with respect to the group of idle and colliding tiles, should be construed to mean that colliding and/or idle tiles are allocated to the given femto cell BS. It should also be understood that any tiles allocated to the given femto cell base station in a previous frame that do not collide with transmissions from other femto cell base stations and are not idle may be retained by the given femto cell base station for its use. The method may return to step 604 and steps 606-610 may be repeated until all sets or blocks of tiles have been evaluated.

If, at step 604, the last set of the sets of P tiles is reached, the process may proceed to step 310 in which the given femto cell base station assigns the reallocated tiles and the retained tiles to its clients and transmits assignment messages to its clients to permit communication on the reallocated and the retained tiles. As discussed above, steps 312 and 310 may be iterated for subsequent frames until all tiles assigned by the given femto cell to its clients do not collide with signals transmitted by other femto cell base stations. Once collision has been resolved, the schedule for the allocated tile is retained in the subsequent frames.

It should be understood that if, at any point in method 600, no idle tiles are detected, the process may revert to method 400 in which a hash table of size two is employed to generate a hash function and apply the hash function to each collided tile, as discussed above with respect to FIG. 4.

Unlike collision resolution method 400, collision resolution method 600 determines tiles that are in collision as well as those that are idle and rehashes based on the remaining free resources. Hence, the size of the hash table varies from one frame to another and is not fixed at two. Thus, by the end of method 600, all resources are used, thereby bridging the performance gap with respect to the optimal allocation scheme. It can be shown that the convergence to optimal is on average, performed within 5-6 frames, which well within limits of practical feasibility.

As discussed above, in both the isolated and coupled models, femto cell base stations may employ orthogonal resources, such as those represented by element 214 in FIG. 2. In the isolated model, resources may be orthogonalized between the macro and femto cells to reduce compatibility and coordination between them so that third-party femto BS can be purchased by consumers. In addition, in the coupled model, orthogonal resources may be used by femto cell base stations in areas in which they may interfere with macro cell base station transmissions, as discussed in more detail below with respect to location-based resource allocation methods. In either case, the macro cell BS or the network controller may maximize the aggregate system utility by basing the split of resources, for example, tiles in a frame, between macro and femto cell base stations on user population for one of or both the femto cell base stations and the macro cell base station. User-population may vary between macro and femto cell users due to users moving in and out of buildings, for example. Further, user-population variance may also be due to users closing connections with the macro cell base station and/or femto cell base stations and new users accessing either type of base station.

While indirect coordination can be enabled between the femto cell base stations and the macro cell base station on a cable backhaul, such coordination typically can be enabled only at coarse time scales, on the order of several tens-hundreds of frames, and not at the granularity of every frame. When the user population changes appreciably for macro cell base stations and/or femto cell base stations, one potential approach for dynamically allocating resources may be to start from the current resource split and iteratively adapt (adjust) the split until an optimum allocation is attained. However, this would incur a large number of iterations, during which time a sub-optimal allocation would be used, thereby depreciating system performance.

To enable faster convergence to the optimal resource split, an intelligent initial split should be set before performing the dynamic adaptation. The optimal split for an idealistic model is computed in closed-form. Using this as the starting point, the split may be iteratively adapted to converge to the optimum in practice. The high quality of the initial starting point helps the adaptation quickly converge within four iterations. For the isolated case, it can be shown that if all the femto/macro cell users receive the same throughput in an idealistic model, then the optimal number of tiles allocated to the femto cells is $$\frac{NF}{F+M},$$

where N is the total number of tiles, and F and M are the number of femto cell users and macro cell users in the system, respectively. In addition, for the coupled case, it can also be shown that if all the femto/macro cell users receive the same throughput in an idealistic model, then the optimal number of tiles allocated to the femto cells is $$\frac{NF_i}{F+M},$$

where N is the total number of tiles, and F and M are the number of femto cell users and total users in the system respectively, with $F_i$ being the number of interior femto cell users. Further, in the coupled case, it can be shown that it is optimal for only the interior femto cell users to use the orthogonal channels allocated to the femto cell base stations, while the exterior femto users only reuse the tiles allocated to the macro cell base station. However, exterior femto cell users may also use the orthogonal channels allocated to the femto cells in addition to reusing tiles allocated to the macro cell base station in exemplary embodiments of the present invention.

It should be noted that "interior femto cells" should be understood to mean femto cells that are interfered by transmissions on macro cell resources. Conversely, "exterior femto cells" cause interference to transmissions on macro cell resources. Determination of whether a femto cell base station is interior or exterior may depend on its location and may be based on a degree of interference that exceeds some threshold, as discussed further below, which may be selected in accordance with design choice.

Given a practical geographical distribution of macro and femto users, the throughputs provided by a proportional fairness model would vary even within users of the same category (macro or femto). To address this, further adaptation of the split may be applied, as described further below.

TABLE 5

Algorithm 4 Femto-Macro Allocation: FMA1

1: % G (Macro BS or n/w controller) estimates change in femto, macro user population
2: if $|F_c - F_l| + |M_c - M_l| \geq \beta(F_l + M_l)$ then 3: 
$$T_f = \left\lfloor \frac{NF_c}{F_c + M_c} \right\rfloor, T_m = T - T_f$$

Figure 7:
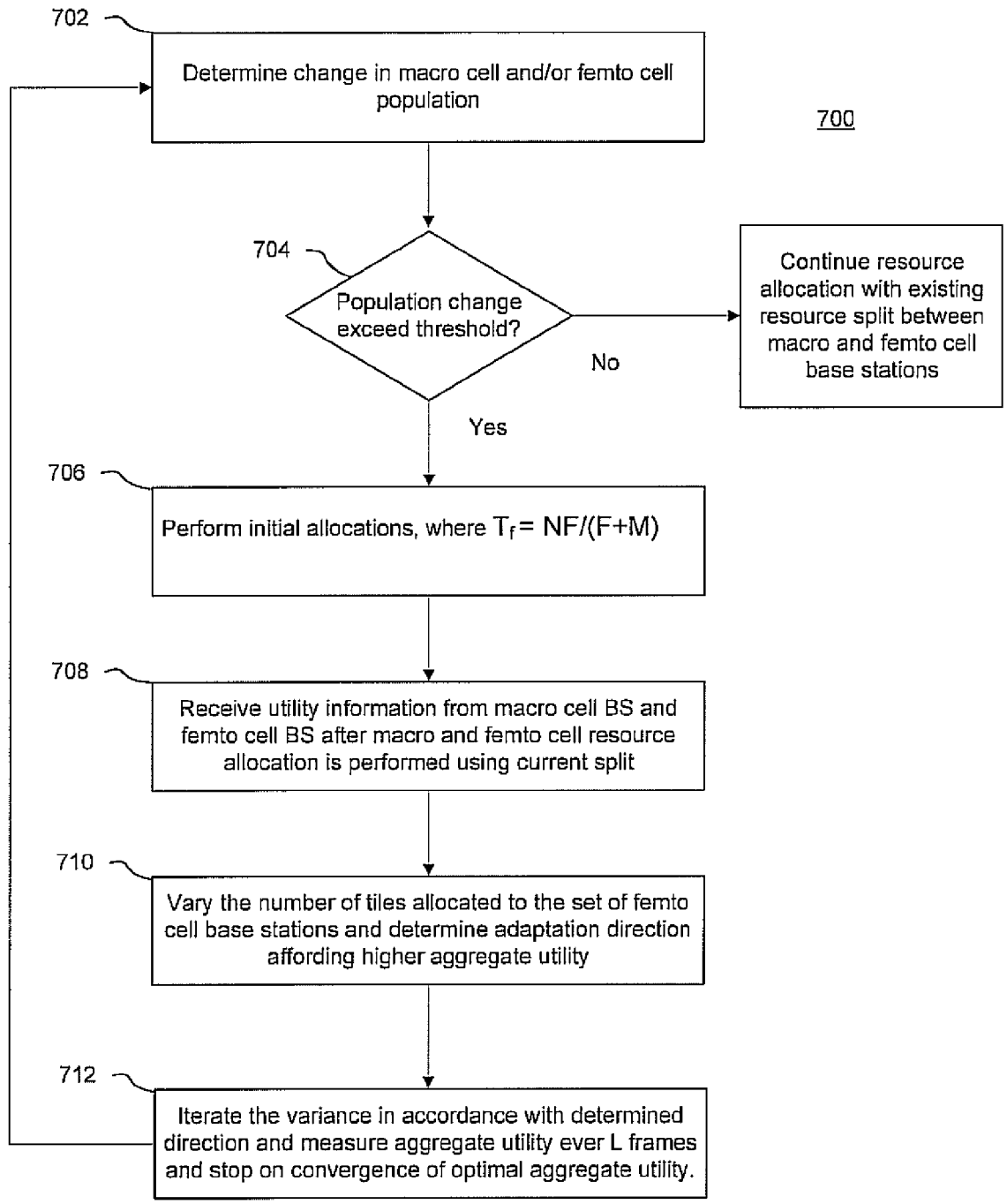
FIG. 7 is a block/flow diagram illustrating a method for splitting resources between a macro cell base station and femto cell base stations in an isolated architecture based on user-population variance in accordance with one exemplary embodiment of the present invention.

4: $U_c$ = Execute MA_DRA($T_m, T_f$)
5: $U_l = U_c$
6: $T_f^+ = T_f + \delta$, $T_m = T - T_f$
7: $U^+$ = Execute MA_DRA($T_m, T_f^+$)
8: $T_f^- = T_f - \delta$, $T_m = T - T_f$
9: $U^-$ = Execute MA_DRA($T_m, T_f^-$)
10: if $U^+ > U_l$ then
11:     $\Delta = +\delta$ ; $T_f = T_f^+$ ; $U_c = U^+$
12: else
13:     if $U^- > U_l$ then
14:         $\Delta = -\delta$ ; $T_f = T_f^-$ ; $U_c = U^-$
15:     end if
16: else
17:     $\Delta = 0$
18: end if
19: while $U_c \geq \gamma U_l$ do
20:     $U_l = U_c$
21:     $T_f = T_f + \Delta$, $T_m = T - T_f$
22:     $U_c$ = MA_DRA($T_m, T_f$)
23: end while
24: Retain ($T_m, T_f$); $F_l = F_c$, $M_l = M_c$
25: else
26:     Continue with current split
27: end if
28:
29: MA_DRA($T_m, T_f$)
30: Execute MA( $T_m$ ) for L frames
31: Execute DRA( $T_f$ ) for L frames
32: G collects utility information from all femto and macro BS and outputs:
    $U = \alpha U_F + (1 - \alpha)U_M$ With reference now to FIG. 7, a method 700 for dynamic allocation of tiles corresponding to time-frequency resource blocks of OFDMA frames between a macro cell base station and a set of distributed femto cell base stations within the macro cell based on user-population variance in accordance with one exemplary embodiment of the present invention is illustrated. Method 700 may be applied in the isolated architecture of femto and macro cell base stations. To aid in describing method 700, reference is also made to Table 5 provided above, which illustrates an exemplary algorithm, termed "FMA1" or "Algorithm 4," for dynamically allocating tiles of OFDMA frame based on user-population in the isolated case.

Method 700 may begin at step 702, in which the macro cell base station or the network controller determines the change in macro cell and/or femto cell user population. The change may be determined based on information provided by the macro cell base station and/or information provided by femto cell base stations through a cable backhaul, for example.

At step 704, the macro cell base station or a network controller detects that a change in user-population serviced by at least one of the macro cell base station or the set of distributed femto cell base stations exceeds a threshold. For example, as shown in step 2 of the exemplary Algorithm 4 of Table 5, user-population variance may exceed a threshold: $|F_c-F_l|+|M_c-M_l| \geq \beta(F_l+M_l)$, where $F_c$ is the current number of femto cell users, $F_l$ is a previous number of previous femto cell users, $M_c$ is the current number of macro cell users, $M_l$ is a previous number of previous femto cell users, and $\beta$ is a constant that may be based on design choice. If the user-population variance does not exceed the threshold, then the current allocation scheme is retained and resource allocation can be continued using the current split. If the user-population variance does exceed the threshold, the method may proceed to step 706. While the determination of user-population variance by considering the change in both femto and macro user populations is employed in exemplary Algorithm 4, the determination of user-population variance may alternatively be based on either femto cell users or macro cell users.

At step 706, the macro cell base station or the network controller may perform an initial allocation in which the set of femto cell base stations are allocated $$\frac{NF}{F + M}$$

of the available tiles and in which the macro cell base station is allocated remaining tiles. Here, N is the total number of said tiles, F is the total number of femto cell users and M is the total number of macro cell users. As shown in Algorithm 4 of Table 5, the initial tile allocation to the femto cell base stations may be denoted as $T_f$, the initial tile allocation to the macro cell base stations may be denoted as $T_m$, and the total number of available tiles may be denoted as T.

At step 708, the macro cell base station or the network controller may receive utility information from the femto cell base stations and, if a network controller is employed, the macro cell base station. For example, as shown in steps 4-5 of Algorithm 4 of Table 5, macro and femto cell resource allocation mechanisms may be executed. For the macro cell access resource allocation mechanism (MA), in this exemplary embodiment, the macro cell base station employs proportional fairness based resource allocation, whereby for every tile (t) assigned to the macro BS, the macro user providing the highest marginal utility is scheduled as $$m^*(t) = \mathrm{argmax}_m \frac{R_m(t)}{\overline{R}_m}$$

where $R_m(t)$ is the rate of user m on tile t, while $\overline{R}_m$ is the average throughput of user m thus far. For femto resource allocation, one of the DRA/DRA+ schemes described above with respect to method 300 is individually run by the femto BS. The femto cell resource allocation may be run for L frames to permit convergence in the femto case. After the resource allocation phase ends, the network controller may receive utility information from the femto cell base stations, for example, from a cable backhaul, and from the macro cell base station to determine the aggregate system utility resulting from the current resource split. For example, as discussed above, the aggregate system utility is $U=\alpha U_F+(1-\alpha)U_M$, where $U_F$ is the utility received by femto cell users, $U_M$ is the utility received by macro cell users, and $\alpha$ is the prioritization factor.

At step 710, the macro cell or the network controller may vary the number of tiles allocated to the set of femto cell base stations. For example, as shown in steps 6-18 of Algorithm 4 of FIG. 5, the network controller or the macro cell base station increases and decreases the femto resources (fraction of tiles allocated to femto cells) by δ and observes the resulting utility to determine the direction of adaptation affording a higher aggregate utility.

At step 712, the macro cell base station or the network controller may iterate the variance until a utility measure for the macro and femto cell base stations is optimized. For example, once the direction of adaptation is determined, as shown in steps 19-24 of Algorithm 4 of Table 5, the process iterates to adjust the varying in the determined direction of adaptation and to converge to the optimal resource split, which is retained thereafter until the next appreciable user population change.

It can be shown that by using a carefully chosen starting point as discussed above permits resource allocation between the macro cell base station and the femto cell base stations to converge to the optimum within four iterations with each iteration involving L=5 frames, thereby resulting in a total of about 20 frames. Given that user population variations occur at the granularity of several minutes, the convergence rate of FMA1 (20 frames×5 ms/frame=100 ms) is significantly fast, keeping the performance loss due to sub-optimality during the adaptation phase to a minimum.

Figure 8:
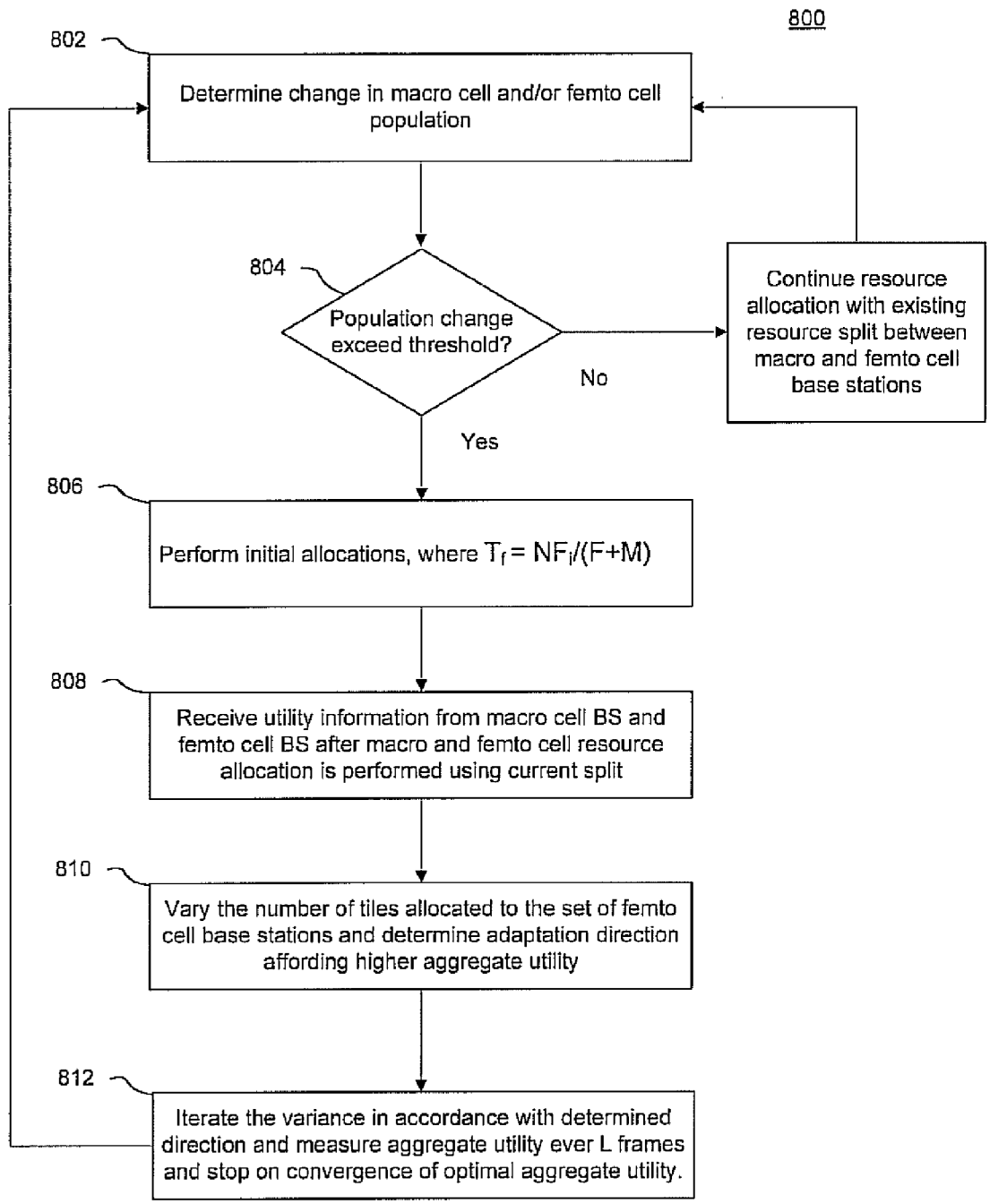
FIG. 8 is a block/flow diagram illustrating a method for splitting resources between a macro cell base station and femto cell base stations in a coupled architecture based on user-population variance in accordance with an alternative exemplary embodiment of the present invention.

With reference now to FIG. 8, a method 800 for dynamic allocation of tiles corresponding to time-frequency resource blocks of OFDMA frames between a macro cell base station and a set of distributed femto cell base stations within the macro cell based on user-population variance in accordance with one exemplary embodiment of the present invention is illustrated. Method 800 may be applied in the coupled architecture of femto and macro cell base stations. Method 800 is the same as method 700 except that the femto cell base stations are initially allocated $$\frac{NF_i}{F+M}$$

in step 806 as opposed to $$\frac{NF}{F+M}$$

in step 706, where N is the total number of tiles, and F and M are the number of femto cell users and total users in the system respectively, with $F_i$ being the number of interior femto cell users. $F_i$ may be determined locally by each femto cell base station and provided to the network controller or the macro cell base station. In addition, the resource allocation between macro and femto cells may be replaced with the location-based resource allocation scheme, described in detail below. With the reuse of macro resources by femto cells, the same solution proposed in the isolated model does not provide good convergence. Thus, the starting point of adaptation has been modified to account for the additional level of spatial reuse and to ensure fast convergence.

While architectures described above permit for spatial reuse within the femto cells, strict orthogonalization of resources between macro and femto cells tends to restrict system capacity. To enlarge system capacity, certain femto cells may be configured to reuse resources, such as resources 212 described above with respect to FIG. 2, which have been allocated to the macro cell. For example, due to the smaller size of femto cells, those that are farther, such as femto cell BS 104 of FIG. 1, from the macro cell BS will not be interfered by it. But, macro users, such as macro user 130, close to such farther femto cell base stations would still be interfered by the farther femto cell BS. However, the farther femto BS, for example, femto cell BS 104, can still reuse those macro resources that are not scheduled to macro users, such as macro cell user 130, located in its vicinity. This permits for an additional level of spatial reuse where the femto cells can reuse resources assigned to the macro cell. However, the interference between macro and femto cells operating on the same resources should now be taken into account.

Because the interference on macro users is macro-schedule dependent, to facilitate this additional level of spatial reuse, some schedule information of the macro cell should be provided to the femto cells. Providing this information on the backhaul would incur significant delay, reducing the usefulness of such information for resource allocation in femto cells. Hence, in accordance with exemplary aspects of the present invention, the forward wireless link of the macro cells may be used to convey such information. In WiMAX systems, for example, the macro cell BS computes the schedule for the uplink and downlink frames and appends it to the beginning of the respective frame in the form of a resource allocation map (MAP), indicating to the user the tiles allocated to it. Further, this MAP is sent at the lowest modulation-coding rate to permit for reliable decoding at the user or client devices. However, to serve the purpose of permitting additional spatial reuse in the femto cell base stations, in addition to the user allocation to a tile, zone allocation information is also appended to the tile, indicating to the femto cell BS the location (zone) where the specific tile will be used in the macro cell. The computation of the zone itself is explained in detail below.

The femto cell base stations will attempt to decode the MAP sent by the macro BS to determine the geographical usage of resources in the macro cell. This helps them determine the set of tiles (resources) that can be reused without incurring interference from the macro cell BS or causing interference to macro users in their vicinity. Given the distributed nature of random access, several frames (L) are employed for convergence, where the benefits of additional spatial reuse can be realized in femto cells. However, this implies that the macro schedule information, being leveraged by femto cells, should remain unchanged for L frames from the point of view of the femto cells. If conventional user-based scheduling is employed, retaining the same schedule over several frames would result in loss of performance due to reduced MUD arising from varying channel conditions of users across frames. Hence, the larger the number of frames over which the macro schedule is retained, the higher is the femto user throughput due to convergence, but lower is the macro user throughput. Thus, to permit efficient reuse of macro resources, the tradeoff between femto and macro user throughput that arises from conventional user-based macro scheduling should be addressed. Further, to maximize aggregate system utility in the presence of additional spatial reuse, the granularity of location information that is provided with the macro schedule as well as the manner in which resources between macro and femto cells are allocated and adapted should be assessed.

To address the tradeoff in femto and macro user throughput arising from user-based scheduling, the following location-based resource allocation solution (LRA) for macro users may be employed. Instead of assigning a tile to simply the user providing the highest marginal utility, LRA determines the user based on not only its highest marginal utility but also the occupancy of the zone to which it belongs in the first frame of an L frame period:

$$m^*(t) = \text{argmax} \left\{ \frac{R_m(t)}{\bar{R}_m} |M_{z(m)}| \right\} \quad (2)$$

$$z^*(t) = z(m^*(t))$$

where $z(m)$ denotes the zone to which user m belongs and $M_{z(m)}$ indicates the set of macro users in zone $z(m)$ with $|M_{z(m)}|$ being the size of the set. A key observation that will be leveraged is that the information employed by the femto cell BS to reuse macro resources is not the specific macro user assigned to a tile, but the zone in which the assigned macro user will use the tile to determine the potential interference it could cause and hence avoid it. Thus, it is sufficient if the zone allocations of the tiles are alone retained for L frames for the femto BS to adapt and efficiently reuse the macro resources. This gives LRA the flexibility to switch users that are within the same zone in subsequent frames based on varying channel conditions without having to change the zone information of the schedule that was notified to the femto cell BS. This alleviates the loss in MUD and hence macro user throughput in subsequent frames. Thus, macro cell BS schedules users in subsequent frames as follows, $$m^*(t) = \arg \max_{m \in z^*(t)} \left\{ \frac{R_m(t)}{\bar{R}_m} \right\}$$

It should be noted that, choosing densely populated macro zones will retain maximum MUD gains by increasing the probability of finding a user with good channel gain within the zone. However, it will not be able to ensure fairness, especially in the sparsely populated zones. Hence, a proper balance of the marginal utility of users as well as the zone size should be utilized to address the tradeoff effectively as in equation 2. One detailed, exemplary implementation of LRA is provided in Algorithm 5 of Table 6:

TABLE 6

Algorithm 5 Location-based Resource Allocation, LRA, example

1: $\mathcal{F}_i \leftarrow$ set of femto BS receiving strong interference from macro BS; $\mathcal{T}_m(f) \leftarrow$ {set of $T_f$tiles}, $\forall f \in F$
2:   for Every period of L frames do
3:     % Macro BS Operations
4:     if first_frame then
5:       for all t ∈ [1,T] do
6:         $m^*(t) = \text{argmax}_m \left\{ \frac{R_m(t)}{\bar{R}_m} |M_{z(m)}| \right\}$
7:         $z^*(t) = z(m^*(t))$
8:         Determine zone information, $Z = \cup_t z^*(t)$
9:       end for
10:     else
11:       for all t ∈ [1,T] do
12:         $m^*(t) = \text{argmax}_{m \in z^*(t)} \left\{ \frac{R_m(t)}{\bar{R}_m} \right\}$
13:       end for
14:     end if
15:     Append tile ($m^*$) and zone (Z) information to MAP
16:     % Femto BS operations
17:     for all f ∈ $\mathcal{F}$ do
18:       Execute DRA+ $\mathcal{T}_m(f)$)
19:       if {{f ∉ $\mathcal{F}_i$} & Decode(MAP)}
20:         then$\mathcal{T}_m(f) \leftarrow \{\cup t\}$, s.t. $z^*(t) \neq Z_f$ end if
21:     end for
22:   end for With reference now to FIG. 9 with continuing reference to Table 6, a method 900 for allocating tiles corresponding to time-frequency resource blocks of OFDMA frames dedicated to a macro cell base station to facilitate reuse of macro cell resources by distributed femto cell base stations in accordance with one exemplary implementation of the present invention is illustrated. It should be understood that a macro cell base station, such as macro cell base station 102 of FIG. 1, may be configured to perform method 900. It should also be understood that method 900 may be employed to permit the reuse and allocation of resources, by femto cell base stations, that were assigned to the macro cell base station, for example, in accordance with method 800. Thus, it may be assumed here the resource split ($T_m$, $T_f$) between macro and femto cells is made available to the macro cell base station.

Method 900 may begin at step 902 in which the macro cell base station obtains channel state information from all macro users on all sub-channels.

At step 904, the macro cell base station may provide or employ a chart defining location zones composing the macro cell. The location zones may correspond to a sector. In addition, the location zones may be preconfigured and provided to the macro cell BS by a network controller or the macro cell BS may configure the location zones itself. How location zones are configured is an important design component, as it directly impacts MAP overhead and has implications on both femto and macro user throughput. The finer the division of the macro cell into zones, the more accurate is the location of the macro schedule information provided to the femto cells and hence the better is their ability to estimate interference and reuse macro resources, thereby improving femto user throughput. However, finer division of the cell into small zones incurs larger number of bits (overhead) in the MAP to indicate zone information. More importantly, it restricts the number of macro users within a zone, reducing the ability to leverage MUD when the macro schedule is retained at the zone level and hence reducing the macro user throughput. Thus, the choice of the zone size has a direct impact on the macro-femto user throughput as well.

In accordance with one exemplary embodiment, the location zones may be approximated as a square grid; however, other configurations may be employed by those of ordinary skill in the art in view of the description provided herein. For a single resource tile, unlike for macro cell users, multiple femto cell user transmissions can be enabled due to spatial reuse. Thus, the utility of providing a resource tile to the femto cells is higher. Hence, the zone size should be biased towards the femto cells to maximize the aggregate system utility. While making the zone size smaller helps achieve this goal, reducing the size beyond a certain extent will result in no appreciable gain from spatial reuse. However, the macro cell performance will continue to degrade. Hence, it is important to achieve the critical zone size, where the gain from spatial reuse saturates. Note that the spatial reuse among femto cells depends on two factors: (i) femto BS density ($f_d$–femto BS per sq. km.), and (ii) interference region of a femto BS calculated at maximum transmission power ($I_f$ meters). Given that there are $f_d$ femto BS per sq. km., the radius (in meters) over which there is only one femto BS is given as $$r_f = \sqrt{\frac{10^6}{\pi f_d}}.$$

If $r_m$ is the radius of the macro cell in meters, the spatial reuse corresponding to $I_f$ and $r_f$ can be given as $$s_i \approx \left\lfloor \left(\frac{r_m}{I_f}\right)^2 \right\rfloor \text{ and } s_f \approx \left\lfloor \left(\frac{r_m}{r_f}\right)^2 \right\rfloor$$

respectively.

It should be noted that even if the interference radius is small, the spatial reuse will be upper bounded by the component ($s_f$) corresponding to femto density radius if $r_f \geq I_f$ as there should be femto cell BS available to leverage the spatial reuse provided by the network ($S_i$), namely $S=\min\{s_i,s_r\}$. Thus, the macro cell base station may be configured to set the zone side to be $z=\max\{I_f,r_f\}$ instead of $z=I_f$, which will leverage spatial reuse to the maximum extent possible without incurring macro throughput degradation and excessive MAP overhead.

Returning to FIG. 9, after providing the chart defining location zones, at step 906, the macro cell base station may determine the number of macro cell users in each location zone based on, for example, the channel state information received from users in step 902.

At step 908, the macro cell base station may determine whether the current frame is the first frame of a set of L frames. As discussed above, L may be set to permit convergence of femto cell tile allocation and is a tunable parameter. If the current frame is the first frame in the L set of frames, then the method may proceed to step 910. Otherwise, the method may proceed to step 914.

At step 910, the macro cell base station may allocate at least a portion of the available tiles allocated to the macro cell base station to macro cell users by considering, for each user, both a total number of macro cell users in a corresponding zone in which the user is located and a marginal utility for the user that is based on instantaneous rate and throughput information for the user. For example, as shown in steps 4-10 of Algorithm 5 of Table 6, in the first frame, the macro BS runs a location-based scheduling algorithm to determine the set of user allocations to tiles and the corresponding zone allocations. Here, macro cell users affording a highest utility and occupancy measure for particular tiles are allocated the tiles. In the exemplary embodiment shown in Table 6, the utility and occupancy measure is $$\frac{R_m(t)}{\overline{R}_m}|M_{z(m)}|,$$

wherein $R_m(t)$ is instantaneous rate information for a particular macro cell user on a particular tile, $\overline{R}_m$ is the average throughput information for the particular macro cell user and $M_{z(m)}$ is a total number of macro cell users in a particular zone in which the particular macro cell user is located.

At step 912, the macro cell base station may transmit to the femto cell base stations an indication of which zones are employed by macro cell users to enable femto cell base stations to assign at least a portion of the tiles to femto cell users. As stated above, the indication may be provided in a MAP. Thus, in addition to the computed macro schedule, the macro BS appends the zone and corresponding tile information to the MAP in its frame transmissions, as shown, for example, in step 15 of Algorithm 5 in Table 6.

Returning to step 908, if the current frame is not the first frame in the L set of frames, then, at step 914, the macro cell may be configured to reallocate tiles only within zones indicated in the indication by considering, for each specific macro cell user, the marginal utility for the specific macro cell user that is based on instantaneous rate and average throughput information for the specific macro cell user to account for variable channel conditions. For example, as illustrated in steps 11-13 of algorithm 5 of Table 6, the macro cell base station reschedules the macro cell users within the zones indicated in the MAP to maximize system utility and leverage MUD. Here, system utility is $$\frac{R_m(t)}{\overline{R}_m},$$

wherein $R_m(t)$ is instantaneous rate information for a particular macro cell user on a particular tile and $\overline{R}_m$ is the average throughput information for the particular macro cell user. The macro cell base station may restrict reallocation of tiles to users within the same zone to permit the femto cell base stations to rely on the accuracy of the zone information appended to the MAP for L frames when allocating tiles to femto cell users. For every period or cycle of L frames, method 900 may be repeated.

Given that the femto cell BS cannot decode the MAP immediately and use the macro schedule information to compute femto allocation for the very same frame, every femto BS may assume itself to be an interior femto cell for the first frame (and subsequently until successful MAP decoding) and uses only the orthogonally assigned resources ($T_f$), for example, as shown in steps 1 and 18 of Algorithm 5 of Table 6. However, those exterior femto cell BS, such femto cell base stations 104 and 110 of FIG. 1, that are able to decode the zone information in the MAP, may determine the set of macro tiles that can be reused by them without causing interference to macro users in the zones ($Z_f$) within their interference range, $I_f$, for example, as shown in steps 19 and 20 of Algorithm 5 of Table 6, where $I_f$ calculated at maximum transmit power. Here, both the macro cell and femto cell base stations may simultaneously transmit signals on the same tiles to their respective users, as long as the femto cell base stations are exterior femto cell base stations with respect to the macro cell and macro cell users. The tiles selected for reuse by femto cell base stations form the set of resources that will be used for their allocations in the subsequent frames. In the subsequent frames, the macro BS retains the zone schedule on the tiles to allow for femto cell adaptation and convergence. However, it reschedules the macro users within the zones to maximize utility and leverage MUD, as stated above. On the other hand, the interior femto cells use the orthogonal resources, while the exterior ones reuse macro resources without generating interference to macro users, thereby leveraging an additional level of spatial reuse, as shown, for example, in steps 16-21 of Algorithm 5 of Table 6.

Figure 9:
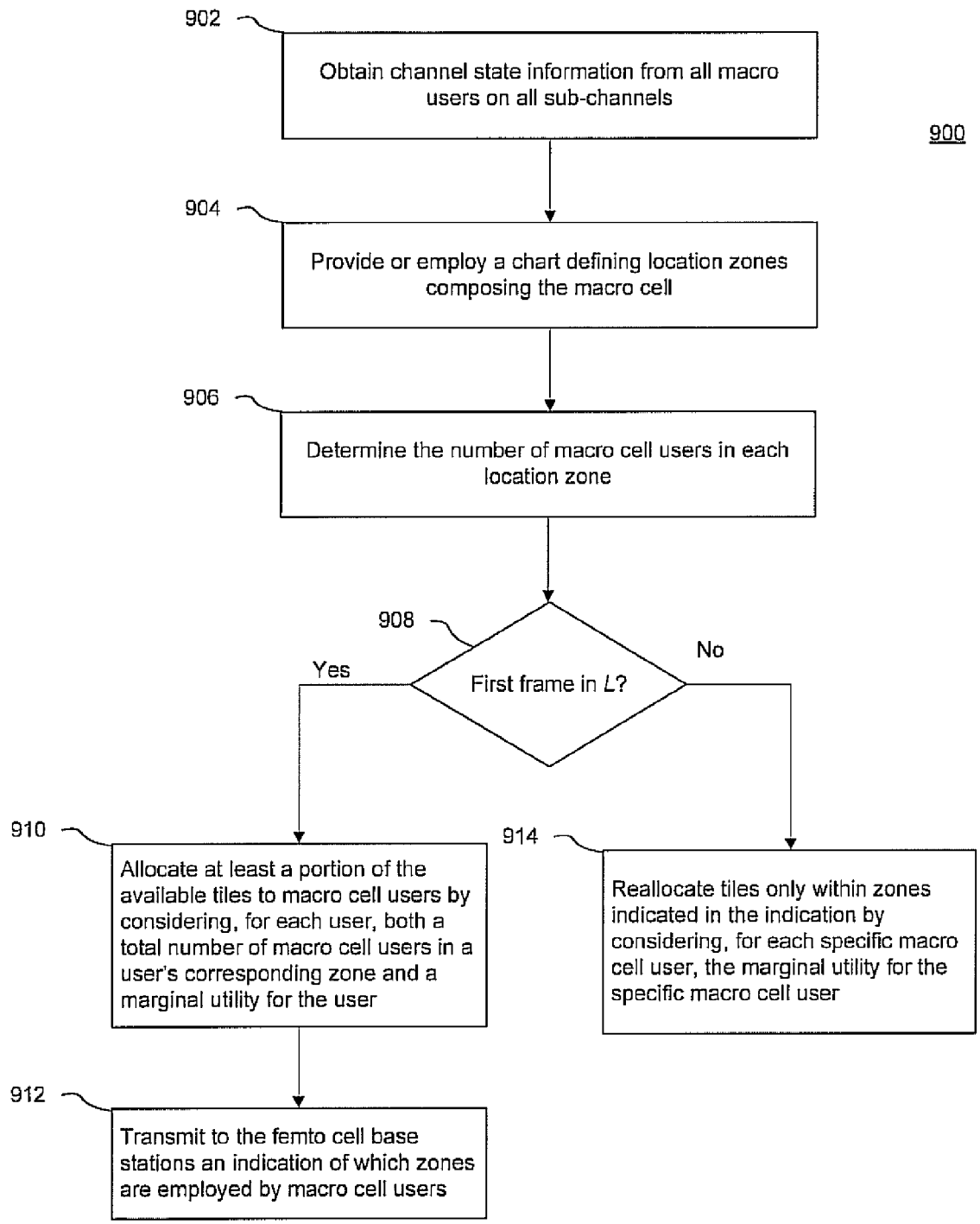
FIG. 9 is a block/flow diagram of an exemplary location-based resource allocation method for allocating tiles to macro cell users in accordance with an exemplary implementation of the present invention.
Figure 10:
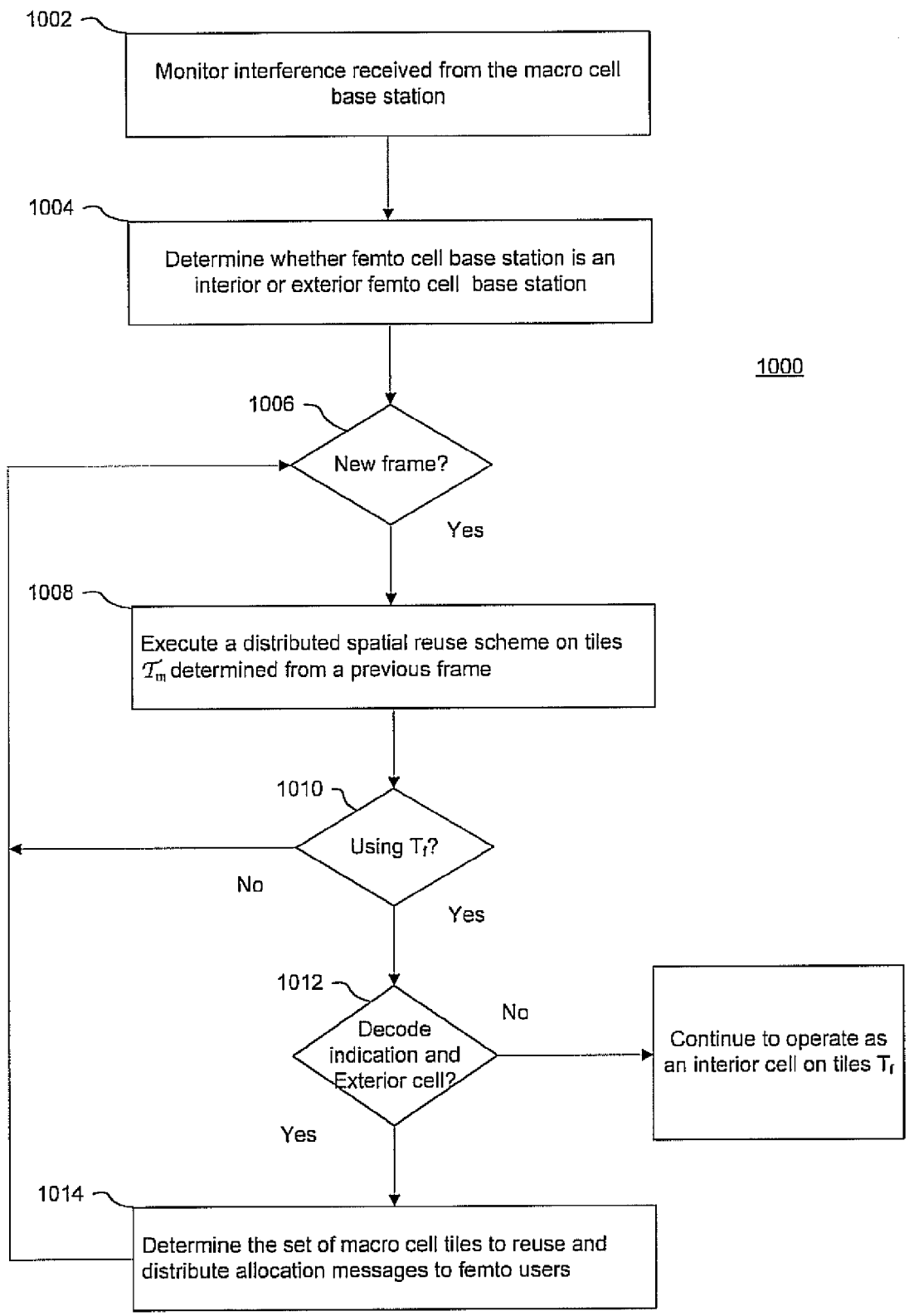
FIG. 10 is a block/flow diagram of an exemplary location-based resource allocation method for allocating tiles to femto cell users in accordance with an exemplary implementation of the present invention.

With reference now to FIG. 10 with continuing reference to FIGS. 1 and 9 and Table 6, a method 1000 for allocating tiles of OFDMA frames to femto cell users in accordance with one exemplary implementation of the present invention is illustrated. Method 1000 may be performed by femto cell base stations simultaneously and in conjunction with the performance of method 900 by a macro cell base station.

In accordance with this exemplary embodiment, every femto cell BS determines if it is an interior cell $F_i$, such as, for example femto cell 112 of FIG. 1, that cannot reuse macro resources based on the interference received from the macro BS. Thus, method 1000 may begin at step 1002, in which femto cell BS may monitor interference received from the macro cell base station. Initially, the femto cell base station assumes that it is an interior femto cell base station, $F_i$.

Accordingly, the available tiles, $T_m$, from which the femto cell may select resources for use by its clients is initially comprised of orthogonal tiles $T_f$, as shown, for example in step 1 of Algorithm 5 of Table 6. As stated above, $T_f$ may correspond to tiles 214 of FIG. 2

At step 1004, the femto cell base station determines whether it is an interior or exterior femto cell base station. For example, if the interference is at or above a threshold, the femto cell base station is determined to be an interior femto cell. Conversely, if the interference is below the threshold, femto cell base station is determined to be an exterior femto cell. The method steps described below are performed for every frame in the set of L frames. As such, at step 1006, the femto cell base station determines if a new frame is reached and proceeds to step 1008 when a new frame is reached.

At step 1008, the femto cell base station may execute a distributed spatial reuse scheme on tiles $T_m$ determined from a previous frame. For example, as shown in step 18 of Algorithm 5 of Table 6, the DRA+ scheme, described above with respect to method 300, may be executed on tiles within the set $T_m$ to allocate resources to its users. Alternatively, DRA may be employed as the resource allocation scheme.

At step 1010, the femto cell base station may determine whether it is using tiles $T_f$ assigned to femto cells. As discussed above, for the coupled architecture, it is optimal for only the interior femto cell users to use the orthogonal channels allocated to the femto cell base stations, while the exterior femto users only employ reused tiles allocated to the macro cell base station. Thus, in this exemplary embodiment, $T_f$ is reserved for interior femto cell base stations. Accordingly, if the femto cell base station is using tiles from $T_f$, then the method may proceed to step 1012.

At step 1012, the femto cell base station determines whether it can decode the indication in, for example, a MAP. If the femto cell cannot decode the indication or if the femto cell is an interior femto cell, then the femto cell base station continues to operate as an interior cell on $T_f$ tiles. If the femto cell base station can decode the MAP and it is an exterior cell, determined for example in step 104, then the femto cell base station may determine the set of macro tiles to reuse at step 1014. For example, as illustrated in steps 19-20 of algorithm 5 of Table 6, the femto cell base station maps macro cell tiles to the set $T_m$ by considering zone and tile information provided in the MAP. For example, the femto cell base station maps a set of macro cell tiles to $T_m$ which are not allocated to macro users in the zones ($Z_f$) within its interference range, $I_f$. Thereafter, step 1006 may be repeated and the method may proceed until a new set of L frames is reached, after which method 1000 may be iterated. In addition, at step 1014, the femto cell base station may distribute allocation messages to femto cell users to permit communication on macro cell tiles within $T_m$.

Returning to step 1010, if the femto cell base station is not using $T_f$ tiles, then the method may repeat steps 1006 and 1008, as the Femto cell is an exterior femto cell that is already using macro cell resources in accordance with zone information received from the macro cell base station. Thereafter, step 1006 may be repeated and the method may proceed until a new set of L frames is reached, after which method 1000 may be iterated.

It can be shown that with increasing L, the performance gain of LRA over user-based macro cell resource allocation is equivalent to that of a selection diversity system of order M*, where M*$\in[1,K_m]$, is the occupancy size of the zone selected in LRA and $K_m$ is the macro population size. Further, LRA retains good fairness properties of proportional fairness (PF)

by virtue of being a weighted PF scheme. The weight is important in restoring the loss in MUD from the macro schedule.

Exemplary implementations of the present invention discussed above provide efficient resource management solutions for OFDMA-based femto cells. A completely distributed and simple-to-implement resource allocation solution for femto cells has been described with performance guarantees. Optimal resource allocation between macro and femto cells has also been addressed. Further, a novel location-based resource management solution for leveraging maximal spatial reuse from femto cells by allowing femto cells reuse macro resources has been disclosed. Comprehensive evaluations indicate that with carefully designed resource management solutions applied in accordance with the above-described teachings, femto cells have the potential to increase the system performance by two folds over static resource allocation schemes.

It should be understood that although the present invention has been described with respect to femto cell base stations, the present invention, except for the use of a cable backhaul, may equivalently be applied to relay stations in lieu of femto cell base stations, as noted above.

It should also be understood that embodiments described herein may be entirely hardware or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. Any method described herein may be implemented in the program. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for allocating tiles corresponding to time-frequency resource blocks of orthogonal frequency division multiple access (OFDMA) frames dedicated to a macro cell base station to facilitate reuse of macro cell resources by distributed extension cell base stations, said method comprising:
providing a chart defining location zones composing the macro cell;
allocating at least a portion of said tiles to macro cell users by considering, for each user, both a total number of macro cell users in a corresponding zone in which the user is located and a marginal utility for the user that is based on instantaneous rate and throughput information for the user; and
transmitting to the extension cell base stations an indication of which zones are employed by macro cell users to enable extension cell base stations to assign at least a portion of said tiles to extension cell users,
wherein tiles are allocated to macro cell users affording a highest utility and occupancy measure, wherein said utility and occupancy measure is $$\frac{R_m}{R'_m}|M_{z(m)}|,$$

wherein $R_m$ is instantaneous rate information for a particular macro cell user on a particular tile, $R'_m$ is the average throughput information for the particular macro cell user and $M_{z(m)}$ is a total number of macro cell users in a particular zone in which the particular macro cell user is located.

2. The method of claim 1, wherein said allocating is performed during an initialization time frame and wherein said method further comprises performance of the following steps during subsequent time frames:
with respect to macro cell users, reallocating tiles only within zones indicated in said indication by considering, for each specific macro cell user, the marginal utility for the specific macro cell user that is based on instantaneous rate and average throughput information for the specific macro cell user to account for variable channel conditions.

3. The method of claim 2, wherein tiles are reallocated, during said subsequent time frames, to macro cell users within each corresponding zone affording a highest utility measure, wherein said utility measure is $$\frac{R_m}{R'_m},$$

wherein $R_m$ is instantaneous rate information for a particular macro cell user on a particular tile and $R'_m$ is the average throughput information for the particular macro cell user.

4. The method of claim 2, wherein said initialization time frame and said subsequent time frames compose a cycle of time frames, wherein said allocating and reallocating are repeated during a subsequent cycle.

5. The method of claim 1, wherein at least one of said extension cell base stations transmit signals to corresponding extension cell users on at least some of said tiles simultaneously with transmission of signals on the at least some of said tiles by the macro cell base station.

6. The method of claim 1, wherein said providing further comprises configuring sizes of said zones by determining the higher of: a) an average area in which only one extension cell is located that is based on a extension cell density of said distributed extension cell base stations; and b) an interference region of one of said extension cell base stations that is based on maximum transmission power of the one of said extension cell base stations.

7. The method of claim 1, wherein said indication is provided through a resource allocation map.

8. A system for allocating tiles corresponding to time-frequency resource blocks of orthogonal frequency division multiple access (OFDMA) frames system dedicated to a macro cell base station comprising:

the macro cell base station, wherein the macro cell base station is configured to employ a chart defining location zones composing the macro cell and to allocate at least a portion of said tiles to macro cell users by considering, for each user, both a total number of macro cell users in a corresponding zone in which the user is located and a marginal utility for the user that is based on instantaneous rate and average throughput information for the user, wherein said macro cell base station is further configured to transmit an indication of which zones are employed by macro cell users; and a set of distributed extension cell base stations, wherein each particular extension cell base station is configured to monitor interference from the macro cell base station and to decode the indication received from the macro cell base station, wherein, if said interference is below a threshold, the particular extension cell base station is further configured to select a set of said tiles to reuse for extension cell users based on said indication and to distribute allocation messages to the extension cell users to permit communication on said set of tiles, wherein the macro cell base station is further configured to allocate tiles to macro cell users affording a highest utility and occupancy measure, wherein said utility and occupancy measure is $$\frac{R_m}{R'_m}|M_{z(m)}|,$$

wherein $R_m$ is instantaneous rate information for a particular macro cell user on a particular tile, $R'_m$ is the average throughput information for the particular macro cell user and $M_{z(m)}$ is a total number of macro cell users in a particular zone in which the particular macro cell user is located.

9. The system of claim 8, wherein said macro cell base station is further configured to perform the allocation of tiles during an initialization time frame and wherein the macro cell base station is further configured to perform the following during subsequent time frames:

with respect to macro cell users, reallocating tiles only within the zones indicated in said indication by considering, for each specific macro cell user, the marginal utility for the specific macro cell user that is based on instantaneous rate and average throughput information for the specific macro cell user to account for variable channel conditions.

10. The system of claim 9, wherein said macro cell base station is further configured to, during said subsequent time frames, allocate tiles to macro cell users affording a highest utility measure, wherein said utility measure is $$\frac{R_m}{R'_m},$$

wherein $R_m$ is instantaneous rate information for a particular macro cell user on a particular tile and $R'_m$ is the average throughput information for the particular macro cell user.

11. The system of claim 9, wherein said initialization time frame and said subsequent time frames compose a cycle of time frames, wherein said allocation and reallocation are repeated during a subsequent cycle.

12. The system of claim 8, wherein at least one of said extension cell base stations transmit signals to corresponding extension cell users on at least some of said tiles simultaneously with transmission of signals on the at least some of said tiles by the macro cell base station.

13. The system of claim 8, wherein said set of tiles are allocated in zones of said macro cell that differ from the zones indicated in said indication.

14. The system of claim 8, wherein said zones are configured in a square grid in which a side of each zone is the higher of: a) an average area in which only one extension cell is located that is based on a extension cell density of said distributed extension cell base stations; and b) an interference region of one of said extension cell base stations that is based on maximum transmission power of the one of said extension cell base stations.

15. The system of claim 8, wherein said macro cell base station is further configured to size said zones by determining the higher of: a) an average area in which only one extension cell is located that is based on a extension cell density of said distributed extension cell base stations; and b) an interference region of one of said extension cell base stations that is based on maximum transmission power of the one of said extension cell base stations.

16. The system of claim 8, wherein each extension cell base station of said set of distributed extension cell base stations is further configured to assign a different group of tiles for extension cell base station use that are orthogonal to the tiles dedicated to the macro cell base station.

17. The system of claim 16, wherein each extension cell base station is further configured to employ only said different group of tiles if said interference is at or above said threshold.

18. The system of claim 8, wherein said indication is provided through a resource allocation map.

* * * * *